United States Patent
Zhai et al.

(10) Patent No.: US 9,830,311 B2
(45) Date of Patent: Nov. 28, 2017

(54) TOUCH KEYBOARD USING LANGUAGE AND SPATIAL MODELS

(71) Applicant: Google Inc., Mountain View, CA (US)

(72) Inventors: Shumin Zhai, Los Altos, CA (US); Ciprian Ioan Chelba, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 476 days.

(21) Appl. No.: 14/477,490

(22) Filed: Sep. 4, 2014

(65) Prior Publication Data

US 2014/0372880 A1 Dec. 18, 2014

Related U.S. Application Data

(63) Continuation of application No. 13/789,106, filed on Mar. 7, 2013, now Pat. No. 8,832,589.

(Continued)

(51) Int. Cl.
*G06F 3/048* (2013.01)
*G06F 17/27* (2006.01)
(Continued)

(52) U.S. Cl.
CPC .......... *G06F 17/277* (2013.01); *G06F 3/0237* (2013.01); *G06F 3/04883* (2013.01);
(Continued)

(58) Field of Classification Search
CPC .................................................... G06F 3/0481
See application file for complete search history.

(56) References Cited

U.S. PATENT DOCUMENTS 4,534,261 A   8/1985   Fabrizio
4,833,610 A   5/1989   Zamora et al.
(Continued)

FOREIGN PATENT DOCUMENTS

CN   1248333 A   3/2000
CN   1954355 A   4/2007
(Continued)

OTHER PUBLICATIONS

"Hey Apple, What the Next iPhone Really, Really Needs Is a Much Better Keyboard," by Natasha Lomas, downloaded Apr. 22, 2013, from techcrunch.com/2013/04/21/the-iphone-keyboard-stinks/?, 6 pp.

(Continued)

*Primary Examiner* — Matthew Ell
(74) *Attorney, Agent, or Firm* — Shumaker & Sieffert, P.A.

(57) ABSTRACT

A computing device outputs for display at a presence-sensitive display, a graphical keyboard comprising a plurality of keys, receives an indication of at least one gesture to select a group of keys of the plurality of keys, and determines at least one characteristic associated with the at least one gesture to select the group of keys of the plurality of keys. The computing device modifies a spatial model based at least in part on the at least one characteristic and determines a candidate word based at least in part on data provided by the spatial model and a language model, wherein the spatial model provides data based at least in part on the indication of the at least one gesture and wherein the language model provides data based at least in part on a lexicon. The computing device outputs for display at the presence-sensitive display, the candidate word.

17 Claims, 7 Drawing Sheets

Related U.S. Application Data

(60) Provisional application No. 61/752,790, filed on Jan. 15, 2013.

(51) Int. Cl.
*G06F 3/0488* (2013.01)
*G06F 3/023* (2006.01)

(52) U.S. Cl.
CPC ........ *G06F 3/04886* (2013.01); *G06F 17/275* (2013.01); *G06F 17/2735* (2013.01)

(56) References Cited

U.S. PATENT DOCUMENTS

| | | |
|---|---|---|
| 4,847,766 A | 7/1989 | McRae et al. |
| 4,988,981 A | 1/1991 | Zimmerman et al. |
| 5,075,896 A | 12/1991 | Wilcox et al. |
| 5,307,267 A | 4/1994 | Yang |
| 5,319,747 A | 6/1994 | Gerrissen et al. |
| 5,440,070 A | 8/1995 | Okamoto et al. |
| 5,502,803 A | 3/1996 | Yoshida et al. |
| 5,521,986 A | 5/1996 | Curtin, II et al. |
| 5,606,494 A | 2/1997 | Oshima et al. |
| 5,677,710 A | 10/1997 | Thompson-Rohrlich |
| 5,684,873 A | 11/1997 | Tiilikainen |
| 5,717,939 A | 2/1998 | Bricklin et al. |
| 5,748,512 A * | 5/1998 | Vargas ............... G06F 3/04886 345/173 |
| 5,761,689 A | 6/1998 | Rayson et al. |
| 5,765,180 A | 6/1998 | Travis |
| 5,781,179 A | 7/1998 | Nakajima et al. |
| 5,784,504 A | 7/1998 | Anderson et al. |
| 5,805,167 A | 9/1998 | Van Cruyningen |
| 5,845,306 A | 12/1998 | Schabes et al. |
| 5,848,187 A | 12/1998 | Bricklin et al. |
| 5,903,229 A | 5/1999 | Kishi |
| 5,905,246 A | 5/1999 | Fajkowski |
| 5,917,493 A | 6/1999 | Tan et al. |
| 5,953,541 A | 9/1999 | King et al. |
| 6,008,799 A | 12/1999 | Van Kleeck |
| 6,032,053 A | 2/2000 | Schroeder et al. |
| 6,041,292 A | 3/2000 | Jochim |
| 6,047,300 A | 4/2000 | Walfish |
| 6,057,845 A | 5/2000 | Dupouy |
| 6,061,050 A | 5/2000 | Allport et al. |
| 6,072,473 A | 6/2000 | Muller et al. |
| 6,094,188 A | 7/2000 | Horton et al. |
| 6,115,482 A | 9/2000 | Sears et al. |
| 6,131,102 A | 10/2000 | Potter |
| 6,150,600 A | 11/2000 | Buchla |
| 6,160,555 A | 12/2000 | Kang et al. |
| 6,278,453 B1 | 8/2001 | Bodnar |
| 6,286,064 B1 | 9/2001 | King et al. |
| 6,292,179 B1 | 9/2001 | Lee |
| 6,310,634 B1 | 10/2001 | Bodnar et al. |
| 6,340,979 B1 | 1/2002 | Beaton et al. |
| RE37,654 E | 4/2002 | Longo |
| 6,396,523 B1 | 5/2002 | Segal et al. |
| 6,407,679 B1 | 6/2002 | Evans et al. |
| 6,417,874 B2 | 7/2002 | Bodnar |
| 6,424,983 B1 | 7/2002 | Schabes et al. |
| 6,438,523 B1 | 8/2002 | Oberteuffer et al. |
| 6,512,838 B1 | 1/2003 | Rafii et al. |
| 6,542,170 B1 | 4/2003 | Williams et al. |
| 6,570,557 B1 | 5/2003 | Westerman et al. |
| 6,573,844 B1 * | 6/2003 | Venolia ............... G06F 3/04886 341/22 |
| 6,630,924 B1 | 10/2003 | Peck |
| 6,674,895 B2 | 1/2004 | Rafii et al. |
| 6,686,931 B1 | 2/2004 | Bodnar |
| 6,789,231 B1 | 9/2004 | Reynar et al. |
| 6,801,190 B1 | 10/2004 | Robinson et al. |
| 6,983,247 B2 | 1/2006 | Ringger et al. |
| 7,028,259 B1 | 4/2006 | Jacobson |
| 7,030,863 B2 | 4/2006 | Longe et al. |
| 7,042,443 B2 | 5/2006 | Woodard et al. |
| 7,075,520 B2 | 7/2006 | Williams |
| 7,088,345 B2 | 8/2006 | Robinson et al. |
| 7,098,896 B2 | 8/2006 | Kushler et al. |
| 7,145,554 B2 | 12/2006 | Bachmann |
| 7,151,530 B2 | 12/2006 | Roeber et al. |
| 7,170,430 B2 | 1/2007 | Goodgoll |
| 7,199,786 B2 | 4/2007 | Suraqui |
| 7,207,004 B1 | 4/2007 | Harrity |
| 7,231,343 B1 | 6/2007 | Treadgold et al. |
| 7,250,938 B2 | 7/2007 | Kirkland et al. |
| 7,251,367 B2 | 7/2007 | Zhai |
| 7,277,088 B2 | 10/2007 | Robinson et al. |
| 7,296,019 B1 | 11/2007 | Chandrasekar et al. |
| 7,336,827 B2 | 2/2008 | Geiger et al. |
| 7,366,983 B2 | 4/2008 | Brill et al. |
| 7,382,358 B2 | 6/2008 | Kushler et al. |
| 7,453,439 B1 | 11/2008 | Kushler et al. |
| 7,479,949 B2 | 1/2009 | Jobs et al. |
| 7,487,461 B2 | 2/2009 | Zhai et al. |
| 7,508,324 B2 | 3/2009 | Suraqui |
| 7,542,029 B2 | 6/2009 | Kushler |
| 7,706,616 B2 | 4/2010 | Kristensson et al. |
| 7,716,579 B2 | 5/2010 | Gunn et al. |
| 7,730,402 B2 | 6/2010 | Song |
| 7,750,891 B2 | 7/2010 | Stephanick et al. |
| 7,809,719 B2 | 10/2010 | Furuuchi et al. |
| 7,831,423 B2 | 11/2010 | Schubert |
| 7,880,730 B2 | 2/2011 | Robinson et al. |
| 7,886,233 B2 | 2/2011 | Rainisto et al. |
| 7,895,518 B2 | 2/2011 | Kristensson |
| 7,907,125 B2 | 3/2011 | Weiss et al. |
| 7,920,132 B2 | 4/2011 | Longe et al. |
| 7,921,361 B2 | 4/2011 | Gunn et al. |
| 7,973,770 B2 | 7/2011 | Tokkonen |
| 8,036,878 B2 | 10/2011 | Assadollahi |
| 8,059,101 B2 | 11/2011 | Westerman et al. |
| 8,135,582 B2 | 3/2012 | Suraqui |
| 8,232,972 B2 | 7/2012 | Huang et al. |
| 8,232,973 B2 | 7/2012 | Kocienda et al. |
| 8,266,528 B1 | 9/2012 | Hayes |
| 8,280,886 B2 | 10/2012 | Labrou et al. |
| 8,359,543 B2 | 1/2013 | Sengupta |
| 8,438,160 B2 | 5/2013 | Aravamudan et al. |
| 8,514,178 B2 | 8/2013 | Song et al. |
| 8,542,206 B2 | 9/2013 | Westerman et al. |
| 8,552,984 B2 | 10/2013 | Knaven |
| 8,587,542 B2 | 11/2013 | Moore |
| 8,619,048 B2 | 12/2013 | Shimoni |
| 8,667,414 B2 | 3/2014 | Zhai et al. |
| 8,701,032 B1 | 4/2014 | Zhai et al. |
| 8,782,549 B2 | 7/2014 | Ouyang et al. |
| 8,819,574 B2 | 8/2014 | Ouyang et al. |
| 2002/0013794 A1 | 1/2002 | Carro et al. |
| 2002/0015064 A1 | 2/2002 | Robotham et al. |
| 2002/0129012 A1 | 9/2002 | Green |
| 2002/0143543 A1 | 10/2002 | Sirivara |
| 2002/0194223 A1 | 12/2002 | Meyers et al. |
| 2003/0006967 A1 | 1/2003 | Pihlaja |
| 2003/0095053 A1 | 5/2003 | Kandogan et al. |
| 2003/0095104 A1 | 5/2003 | Kandogan et al. |
| 2003/0097252 A1 | 5/2003 | Mackie |
| 2003/0165801 A1 | 9/2003 | Levy |
| 2004/0120583 A1 | 6/2004 | Zhai |
| 2004/0140956 A1 | 7/2004 | Kushler et al. |
| 2005/0052406 A1 | 3/2005 | Stephanick et al. |
| 2005/0114115 A1 | 5/2005 | Karidis et al. |
| 2005/0171783 A1 | 8/2005 | Suominen |
| 2005/0190973 A1 | 9/2005 | Kristensson et al. |
| 2006/0004638 A1 | 1/2006 | Royal et al. |
| 2006/0026536 A1 | 2/2006 | Hotelling et al. |
| 2006/0028450 A1 | 2/2006 | Suraqui |
| 2006/0050962 A1 | 3/2006 | Geiger et al. |
| 2006/0053387 A1 | 3/2006 | Ording |
| 2006/0055669 A1 | 3/2006 | Das |
| 2006/0119582 A1 | 6/2006 | Ng et al. |
| 2006/0173674 A1 | 8/2006 | Nakajima et al. |
| 2006/0176283 A1 | 8/2006 | Suraqui |
| 2006/0253793 A1 | 11/2006 | Zhai et al. |

(56) References Cited

U.S. PATENT DOCUMENTS

| | | |
|---|---|---|
| 2006/0256139 A1 | 11/2006 | Gikandi |
| 2006/0265648 A1 | 11/2006 | Rainisto et al. |
| 2007/0016862 A1 | 1/2007 | Kuzmin |
| 2007/0040813 A1 | 2/2007 | Kushler et al. |
| 2007/0083276 A1 | 4/2007 | Song |
| 2007/0089070 A1 | 4/2007 | Jaczyk |
| 2007/0094024 A1 | 4/2007 | Kristensson et al. |
| 2007/0152980 A1 | 7/2007 | Kocienda et al. |
| 2007/0213983 A1 | 9/2007 | Ramsey |
| 2008/0017722 A1 | 1/2008 | Snyder et al. |
| 2008/0100579 A1 | 5/2008 | Robinson et al. |
| 2008/0122796 A1 | 5/2008 | Jobs et al. |
| 2008/0167858 A1 | 7/2008 | Christie et al. |
| 2008/0172293 A1 | 7/2008 | Raskin et al. |
| 2008/0229255 A1 | 9/2008 | Linjama et al. |
| 2008/0232885 A1 | 9/2008 | Mock et al. |
| 2008/0270896 A1 | 10/2008 | Kristensson |
| 2008/0316183 A1 | 12/2008 | Westerman et al. |
| 2009/0058823 A1 | 3/2009 | Kocienda |
| 2009/0100338 A1 | 4/2009 | Saetti |
| 2009/0100383 A1 | 4/2009 | Sunday et al. |
| 2009/0119376 A1 | 5/2009 | Bomma |
| 2009/0189864 A1 | 7/2009 | Walker et al. |
| 2009/0192786 A1* | 7/2009 | Assadollahi ......... G06F 3/0234 704/9 |
| 2010/0021871 A1 | 1/2010 | Layng et al. |
| 2010/0029910 A1 | 2/2010 | Shiba et al. |
| 2010/0070908 A1 | 3/2010 | Mori et al. |
| 2010/0079382 A1 | 4/2010 | Suggs |
| 2010/0125594 A1 | 5/2010 | Li et al. |
| 2010/0131447 A1 | 5/2010 | Creutz et al. |
| 2010/0141484 A1 | 6/2010 | Griffin et al. |
| 2010/0199226 A1 | 8/2010 | Nurmi |
| 2010/0235780 A1 | 9/2010 | Westerman et al. |
| 2010/0238125 A1 | 9/2010 | Ronkainen |
| 2010/0257478 A1 | 10/2010 | Longe et al. |
| 2010/0259493 A1 | 10/2010 | Chang et al. |
| 2010/0271299 A1 | 10/2010 | Stephanick et al. |
| 2010/0315266 A1 | 12/2010 | Gunawardana et al. |
| 2011/0061017 A1 | 3/2011 | Ullrich et al. |
| 2011/0063224 A1 | 3/2011 | Vexo et al. |
| 2011/0063231 A1 | 3/2011 | Jakobs et al. |
| 2011/0066984 A1 | 3/2011 | Li |
| 2011/0071834 A1 | 3/2011 | Kristensson et al. |
| 2011/0103682 A1 | 5/2011 | Chidlovskii et al. |
| 2011/0107206 A1 | 5/2011 | Walsh et al. |
| 2011/0119617 A1 | 5/2011 | Kristensson |
| 2011/0122081 A1 | 5/2011 | Kushler |
| 2011/0141027 A1 | 6/2011 | Ghassabian |
| 2011/0141031 A1 | 6/2011 | McCullough et al. |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0181526 A1 | 7/2011 | Shaffer et al. |
| 2011/0193797 A1 | 8/2011 | Unruh |
| 2011/0202834 A1 | 8/2011 | Mandryk et al. |
| 2011/0202836 A1 | 8/2011 | Badger et al. |
| 2011/0205160 A1 | 8/2011 | Song et al. |
| 2011/0208511 A1 | 8/2011 | Sikstrom et al. |
| 2011/0208513 A1 | 8/2011 | Nicks et al. |
| 2011/0209088 A1 | 8/2011 | Hinckley et al. |
| 2011/0210850 A1 | 9/2011 | Tran |
| 2011/0234524 A1 | 9/2011 | Longe et al. |
| 2011/0242000 A1 | 10/2011 | Bi et al. |
| 2011/0254798 A1 | 10/2011 | Adamson et al. |
| 2011/0291940 A1 | 12/2011 | Ghassabian |
| 2012/0011462 A1 | 1/2012 | Westerman et al. |
| 2012/0029910 A1 | 2/2012 | Medlock et al. |
| 2012/0036468 A1 | 2/2012 | Colley |
| 2012/0036469 A1 | 2/2012 | Suraqui |
| 2012/0036485 A1 | 2/2012 | Watkins, Jr. et al. |
| 2012/0075190 A1 | 3/2012 | Sengupta |
| 2012/0079412 A1 | 3/2012 | Kocienda et al. |
| 2012/0098846 A1 | 4/2012 | Wun et al. |
| 2012/0113008 A1 | 5/2012 | Makinen et al. |
| 2012/0127080 A1 | 5/2012 | Kushler et al. |
| 2012/0127082 A1 | 5/2012 | Kushler et al. |
| 2012/0131035 A1 | 5/2012 | Yang et al. |
| 2012/0131514 A1 | 5/2012 | Ansell et al. |
| 2012/0162092 A1 | 6/2012 | Pasquero et al. |
| 2012/0166428 A1 | 6/2012 | Kakade et al. |
| 2012/0223889 A1* | 9/2012 | Medlock ............. G06F 3/04883 345/168 |
| 2012/0242579 A1 | 9/2012 | Chua |
| 2012/0259615 A1 | 10/2012 | Morin et al. |
| 2012/0274745 A1 | 11/2012 | Russell |
| 2012/0290946 A1 | 11/2012 | Schrock et al. |
| 2012/0310626 A1 | 12/2012 | Kida et al. |
| 2013/0046544 A1 | 2/2013 | Kay et al. |
| 2013/0074014 A1 | 3/2013 | Ouyang et al. |
| 2013/0082824 A1 | 4/2013 | Colley |
| 2013/0120266 A1 | 5/2013 | Griffin et al. |
| 2013/0120430 A1 | 5/2013 | Li et al. |
| 2013/0125034 A1 | 5/2013 | Griffin et al. |
| 2013/0135209 A1 | 5/2013 | Zhai et al. |
| 2013/0176228 A1 | 7/2013 | Griffin et al. |
| 2013/0205242 A1 | 8/2013 | Colby |
| 2013/0212515 A1 | 8/2013 | Eleftheriou |
| 2014/0012568 A1* | 1/2014 | Caskey .................. G06F 17/273 704/9 |
| 2014/0098023 A1 | 4/2014 | Zhai et al. |
| 2014/0201671 A1 | 7/2014 | Zhai et al. |

FOREIGN PATENT DOCUMENTS

| | | |
|---|---|---|
| CN | 101390039 A | 3/2009 |
| CN | 102411477 A | 4/2012 |
| CN | 102508553 A | 6/2012 |
| CN | 102541304 A | 7/2012 |
| EP | 0844570 A2 | 5/1998 |
| EP | 1887451 A1 | 10/2001 |
| EP | 1603014 A1 | 7/2005 |
| EP | 1860576 A1 | 5/2006 |
| WO | 2004066075 A2 | 8/2004 |
| WO | 2007017660 A1 | 2/2007 |
| WO | 2008013658 A2 | 1/2008 |
| WO | 2011113057 A1 | 9/2011 |
| WO | 2013107998 A1 | 7/2013 |

OTHER PUBLICATIONS

"SwiftKey 3 Keyboard—Android Apps on Google Play," found at web.archive.org/web/20121020153209/https://play.google.com/store/apps/details?id=com.touchtype.swiftkey&h1=en, accessed on Oct. 20, 2012, 4 pp.

"SwiftKey Counters Swipe with a Smart Version. Makes an In-Road Into Healthcare Market" by Mike Butcher. found at http://techcrunch.com/2012/06/21/swiftkey-counters-swype-with-a-smarter-version-makes-an-in-road-into-healthcare-market/, Jun. 21, 2012, 1 p.

"Swipe Nuance Home, Type Fast, Swipe Faster," found at http://www.swipe.com/, accessed on May 25, 2012, 1 p.

"7 Swype keyboard lips for better Swyping," by Ed Rhee, found at http://howlo.cnel.com/8301-1131 0_39-20070627-285/7-swype-keyboard-lips-for-better-swyping/, posted Jun. 14, 2011, 5 pp.

Text input for future computing devices (SHARK shorthand and ATOMIK), SHARK Shorthand Home Page, retrieved from http://www.almaden.ibm.com/u/zha/topics/virtualkeyboard.htm, accessed on Sep. 20, 2012, 4 pp.

Accot et al., "Refining Fitts' Law Models for Bivariate Pointing," IBM Almaden Research Center, Paper: Pointing and Manipulating, Apr. 5-10, 2003, pp. 193-200.

Advanced tips for Swype, found at www.swype.com/tips/advanced-tips/, downloaded Aug. 20, 2012, 3 pp.

Alkanhal, et al., "Automatic Stochastic Arabic Spelling Correction with Emphasis on Space Insertions and Deletions," IEEE Transactions on Audio, Speech, and Language Processing, val. 20(7), Sep. 2012, 12 pp.

Android OS—Language & keyboard settings, found at support.google.com/ics/nexus/bin/answer.py? h1=en&answer=168584, downloaded Jun. 4, 2012, 3 pp.

(56) References Cited

OTHER PUBLICATIONS

Avoid iPhone navigation and typing hassles, by Ted Landau, Dec. 28, 2007, found at www.macworld.com/ article/1131264/lco_iphone .him I, 9 pp.
Bellegarda, Statistical Language Model Adaptation: Review and Perspectives, Speech Communication 42, Jan. 2004, pp. 93-108.
CiteSeer, "Token Passing: a Simple Conceptual Model for Connected Speech Recognition Systems" (1989), by S.J. Young et al., found at (http:1/citeseerx.isl.psu.edu/viewdoc/summary?doi=10.1.1.17.7829), accessed on Apr. 30, 2012, 2 pp.
Dasur Pattern Recognition Ltd. SlideiT Keyboard—User Guide, Jul. 2011, found at http://www.mobiletextinput.com/ App_O pen/Manuai/SiideiT_UserGuide%5BEnglish%5Dv4.0.pdf, 21 pp.
Goodman et al., "Language Modeling for Soft Keyboards," Proceedings of the 7th International Conference on Intelligent user interfaces, Jan. 13-16, 2002, pp. 194-195.
Goodman, "A Bit of Progress in Language Modeling Extended Version," Machine Learning and Applied Statistics Group, Microsoft Corporation, Aug. 2001, 73 pp.
Goodman, "A bit of progress in Language Modeling," Computer Speech & Language, Oct. 2001, pp. 403-434.
Goodman, et al., "Language Modeling for Soft Keyboards," Microsoft Research, Nov. 28, 2001, 9 pp.
Gunawardana, et al., "Usability Guided Key-Target Resizing for Soft Keyboards," Proceedings of the 15th International Conference of Intelligent user interfaces, Feb. 7-10, 2010, pp. 111-118.
Harb et al., "Back-off Language Model Compression," Google Inc., 2009, 4 pp.
How to Type Faster with the Swype Keyboard for Android—How-To Geek, found at www.how1ogeek.com/106643/how- to-type-faster-with-the-swype-keyboard-for-android/, downloaded Jun. 4, 2012, 13 pp.
Kane et al., "TrueKeys: Identifying and Correcting Typing Errors for People with Motor Impairments," Proceedings of the 13th International Conference on Intelligent User Interfaces, 1UI '08, Jan. 13, 2008, 4 pp.
Karch, "Typing, Copy, and Search," Android Tablets Made Simple, Nov. 18, 2011, 13 pp.
Keymonk Keyboard Free—Android Apps on Google Play, Description, found at https://play.google.com/store/apps/ details?id=com.keymonk.latin&h1=en, downloaded Oct. 3, 2012, 2 pp.
Keymonk—The Future of Smartphone Keyboards, found at www.keymonk.com, downloaded Sep. 5, 2012, 2 pp.
Kirstensson, et al., "Relaxing Stylus Typing Precision by Geometric Pattern Matching," Proceedings of the 10th International Conference of Intelligent User Interfaces, Jan. 9-12, 2005, pp. 151-158.
Kristensson et al,. "Shark2: A Large Vocabulary Shorthand Writing System for Pen-based Computers," UIST, vol. 6, issue 2, Oct. 24-27, 2004.
Kristensson et al., "Command Strokes with and without Preview: Using Pen Gestures on Keyboard for Command Selection," CHI Proceedings, San Jose, CA, USA, Apr. 28-May 3, 2007, 10 pp.
Ll et al., "A Fast and Accurate Gesture Recognizer," CHI 2010, Apr. 10-15, 2010, Atlanta, Georgia, pp. 2169-2172.
MacKenzie et al., "LetterWise: Prefix-based Disambiguation for Mobile Text Input," Proceedings of the 14th annual ACM Symposium on User Interface Software and Technology, Nov. 11-14, 2001, pp. 111-120.
Mohri, et al., "Speech Recognition With Weighted Finite-State Transducers," Springer Handbook on Speech Processing and Speech Communication, 2008, 31 pp.
Naseem, "A Hybrid Approach for Urdu Spell Checking," MS Thesis, National University of Computer & Emerging Sciences, retrieved from the internet http://www.cle.org.pk!Publication/theses/2004/a_hybrid_approach_for_Urdu_spell_checking.pdf, Nov. 1, 2004, 87 pp.
Nuance Supercharges Swype, Adds New Keyboard Options, XT9 Predictive Text, and Dragon-Powered Voice Input, found at http://techcrunch.com/2012/06/20/nuance-supercharges-swype-adds-new-keyboard-options-xt9-predictive-text-and-dragon-powered-voice-input/, downloaded Jun. 4, 2012, 2 pp.
Rybach et al., "Silence is Golden: Modeling Non-Speech Events in West-Based Dynamic Network Decoders," Human Language Technology and Pattern Recognition, Computer Science Department RWTH Aachen University, Mar. 2012, 4 pp.
Sensory Software—Text Chat, found at www.sensorysoftware.com/textchat.html, downloaded Jun. 4, 2012, 3 pp.
Shape Writer vs Swype Keyboard, DroidForums.net, found at www.droidforums.net/forum/droid-applications/48707-shapewriter-vs-swype-keyboard.html, last updated Jun. 1, 2010, 5 pp.
ShapeWriter Keyboard allows you to input on Android the same experience with on PC, Android forums, found at talkandroid.com/.. ./2767-shapewriter-keyboard-allows-you-input-android-same-experience-pc. html, last updated Oct. 25, 2009, 3 pp.
ShapeWriter Research Project home page, accessed May 25, 2012, found at http://www.almaden.ibm.com/u/zhai/ shapewriter_research.htm, 12 pp.
SlideiT Soft Keyboard, SlideiT [online], First accessed on Jan. 31, 2012, retrieved from the Internet: https:l/play. google .com/store/apps/details?id=com .dasur.slideit. vt.1ite&h 1=en>, 4 pp.
Split Keyboard for iPad [Concept], by Skipper Eye, Apr. 23, 2010, found at http://www.redmondpie.com/split-keyboard-for-ipad-9140675/, 6 pp.
Split Keyboard for Thumb Typing Coming to iPad with iOS 5, by Kevin Purcell, Jun. 6, 2011, found at http://www. gottabemobi Ie . com/20 11/06/06/spl it-keyboard-for-thumb-typing-com ing-to-ipad-with-ios-5/, 8 pp.
Swiftkey 3 Keyboard—Android Apps on Google Play, found at https:l/play.google.com/store/apps/details?id=com. touchtype. swiftkey&h1=en, accessed on Jun. 8, 2012, 2 pp.
Swiftkey, "Swiftkey 3 Keyboard" retrieved from https:l/play. google.com/store/apps/detais, accessed on Jul. 17, 2012, 3 pp.
Swype—Swype Basics, found at www.swype.com/tips/swype-basics/, downloaded Jun. 8, 2012, 2 pp.
Tappert et al., "The State of the Art in On-Line Handwriting Recognition," IEEE Transactions on Pattern Analysis and Machine Intelligence, val. 12, No. 8, Aug. 1990, pp. 787-808.
Welcome to CooTek—Touch Pal, an innovative soft keyboard, TouchPal v1.0 for Android will Release Soon!, found at www.cootek.com/intro-android.aspx, downloaded Aug. 20, 2012, 2 pp.
Why your typing sucks on Android, and how to fix it, by Martin Bryant, Mar. 3, 2010, found at thenextweb.com/ mobile/201 0/03/03/typing-sucks-android-fix/, 3 pp.
Williamson et al., "Hex: Dynamics and Probabilistic Text Entry," Switching and Learning LNCS 3355, pp. 333-342, 2005.
Wobbrock et al., "$1 Unistroke Recognizer in JavaScript," [online], first accessed on Jan. 24, 2012, retrieved from the Internet: http://depts.washington.edu/aimgroup/proj/dollar/, 2 pp.
Wobbrock et al., "Gestures without Libraries, Toolkits or Training: A $1 Recognizer for User Inter face Prototfypes," UIST 2007, Proceedings of the 2oth Annual ACM Symposium on User Interface Software and Technology, Aug. 19, 2007, pp. 159-168.
Written Opinion and International Search Report from International Application No. PCT/US2014/011468, dated Apr. 22, 2014, 11 pp.
Young, et al., "Token Passing: a Simple Conceptual Model for Connected Speech Recognition Systems," Cambridge University Engineering Department, Jul. 31, 1989, 23 pp.
YouTube, "Automatic error correction on graphical keyboard," Retrieved from http://www.youtube.com/watch?v=_VgYrz7Pi60, Uploaded on Jun. 14, 2007, 1 pp.
YouTube, "BlindType—Thank you!," Retrieved from http://www.youtube.com/watch?v=KTw4JexFW-o, uploaded on Jul. 22, 2010, 1 pp.
YouTube, "BlindType—Demo 1," Retrieved from http:///www.youtube.com/watch?v=M9n8NIMd79w, uploaded on Jul. 17, 2010, 1 pp.
YouTube, "BlindType on Android," Retrieved from http://www.youtube.com/watch?v=m6eKm1gUnTE, Uploaded on Aug. 7, 2010, 1 pp.

(56) References Cited

OTHER PUBLICATIONS

Youtube, "BlindType—Demo 2," Retrieved from http://www.youtube.com/watch?v=7gDF4ocLhQM, uploaded on Aug. 2, 2010, 1 pp.

Zhai, et al., "In Search of effective text input interfaces for off the desktop computing," Interacting with Computers 17, Feb. 20, 2004, pp. 229-250.

Zhai, Shumin, "Text input for future computing devices (SHARK shorthand and ATOMICK)," SHARK Shorthand [online], Apr. 23, 2012, first accessed on Jan. 31, 2014, retrieved from the internet: http://web.archive.org/web/20120423013658/http://www.almaden.ibm.com/u/zhai/topics/virtualkeyboard.htm, 3 pp.

U.S. Appl. No. 14/331,37, filed Jul. 14, 2014, by Ouyang et al.

Prosecution History from U.S. Appl. No. 13/789,106, dated from Oct. 30, 2013 through May 6, 2014, 42 pp.

International Preliminary Report on Patentability from International Application No. PCT/US2014/011468, dated Jul. 30, 2015, 8 pp.

First Office Action and Search Report, and translation thereof, from counterpart Chinese Application No. 201480011437.8, dated Jul. 24, 2017, 20 pp.

\* cited by examiner

TOUCH KEYBOARD USING LANGUAGE AND SPATIAL MODELS

CROSS-REFERENCE TO RELATED APPLICATIONS

This application is a continuation of Ser. No. 13/789,106, filed Mar. 7, 2013, which claims the benefit of U.S. Provisional Application No. 61/752,790, filed Jan. 15, 2013, the entire contents of which are incorporated herein in their entirety.

BACKGROUND

Some computing devices (e.g., mobile phones, tablet computers, etc.) may provide a graphical keyboard as part of a graphical user interface for composing text using a presence-sensitive display (e.g., a touchscreen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, the computing device may present a graphical keyboard with which the user can indicate a word by tapping individual keys displayed on the graphical keyboard or by successively sliding a finger over the regions associated with graphical keys representing characters of which the word is comprised. In this way, graphical keyboards provide an input method that allows the user to enter characters, words, or a group of words by one or more gestures. As such, a graphical keyboard may allow the user to achieve a certain degree of efficiency by quickly and accurately entering text.

However, graphical keyboards have certain drawbacks. For example, a computing device may receive a series of tap gestures or sliding gestures from a user paying little attention to accuracy. The characters inputted by the computing device, though, may be different than the characters that the user attempted to select. Consequently, the user may need to correct the inputted characters. As such, entering text with gestures using a graphical keyboard may be difficult and reduce the speed at which the user may interact with the computing device.

SUMMARY

In one example a method includes outputting, by a computing device and for display at a presence-sensitive display, a graphical keyboard comprising a plurality of keys, receiving, by the computing device, an indication of at least one gesture to select a group of keys of the plurality of keys, and determining, by the computing device, at least one characteristic associated with the at least one gesture to select the group of keys of the plurality of keys. The method further includes modifying, by the computing device and based at least in part on the at least one characteristic, a spatial model, determining, by the computing device, a candidate word based at least in part on data provided by the spatial model and a language model, wherein the spatial model provides a first portion of the data based at least in part on the indication of the at least one gesture and wherein the language model provides a second portion of the data based at least in part on a lexicon, and outputting, by the computing device and for display at the presence-sensitive display, the candidate word.

In another example a computer-readable storage medium is encoded with instructions that, when executed, cause one or more processors of a computing device to perform operations comprising: outputting, for display at a presence-sensitive display, a graphical keyboard comprising a plurality of keys, receiving an indication of at least one gesture to select a group of keys of the plurality of keys, and determining at least one characteristic associated with the at least one gesture to select the group of keys of the plurality of keys. The computer-readable storage medium may be encoded with further instructions that, when executed, cause the one or more processors of a computing device to perform operations comprising: modifying, based at least in part on the at least one characteristic, a spatial model, determining a candidate word based at least in part on data provided by the spatial model and a language model, wherein the spatial model provides a first portion of the data based at least in part on the indication of the at least one gesture and wherein the language model provides a second portion of the data based at least in part on a lexicon, and outputting, for display at the presence-sensitive display, the candidate word.

In another example a computing device includes at least one processor that is operatively coupled to a presence-sensitive display and at least one module operable by the at least one processor to output, for display at the presence-sensitive display, a graphical keyboard comprising a plurality of keys, receive, at the presence-sensitive display, an indication of at least one gesture to select a group of keys of the plurality of keys and determine at least one characteristic associated with the at least one gesture to select the group of keys of the plurality of keys. The at least one module may further be operable by the at least one processor to modify, based at least in part on the at least one characteristic, a spatial model, determine a candidate word based at least in part on data provided by the spatial model and a language model, wherein the spatial model provides a first portion of the data based at least in part on the indication of the at least one gesture and wherein the language model provides a second portion of the data based at least in part on a lexicon, and output, for display at the presence-sensitive display, the candidate word.

The details of one or more examples are set forth in the accompanying drawings and the description below. Other features, objects, and advantages will be apparent from the description and drawings, and from the claims.

DETAILED DESCRIPTION

Figure 1:
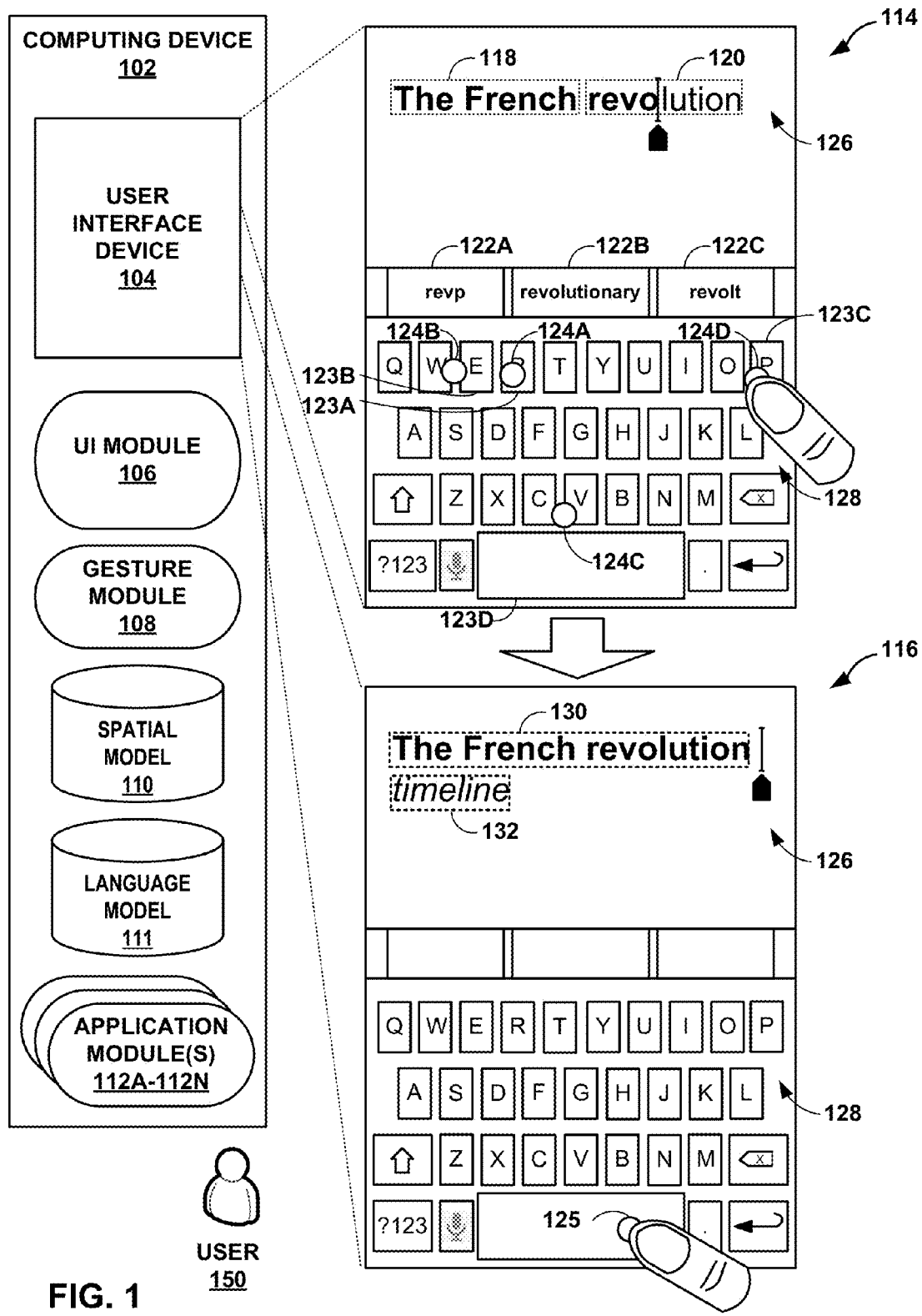
FIG. 1 is a block diagram illustrating an example computing device and graphical user interfaces (GUIs) for providing text input, in accordance with one or more aspects of the present disclosure.

In general, this disclosure is directed to techniques for modifying a spatial model used by a computing device for input determination. The techniques may be based at least in part on a user's text input at a graphical keyboard, the graphical keyboard being outputted for display at a presence-sensitive display. Techniques of the disclosure are also directed to using the spatial model in conjunction with a language model to correct, complete, and/or predict text input based on the text input received. In some examples, mobile devices, such as tablets or smartphones, may provide a presence-sensitive display with which a user may interact. In some examples, the user may provide one or more touch inputs, such as sliding gestures, tap gestures, etc., at the presence-sensitive display. For example, a user may input text to the computing device by interacting with a graphical (i.e., soft) keyboard displayed at the presence-sensitive display. The user may interact with the graphical keyboard by performing touch gestures, such as tapping a finger at the presence-sensitive display or continuously sliding the finger to different locations of the presence-sensitive display. In response to the touch gestures, the computing device may perform one or more operations to generate, select, modify, delete, etc., input data.

A computing device (e.g., a smartphone) may determine text input in response to receiving indications of tapping or sliding gestures at a graphical keyboard to select a sequence of keys. In some examples, a computing device implementing techniques of the disclosure may modify a spatial model employed in correction, completion and/or prediction methods for text inputted via a graphical keyboard. Specifically, in some examples, a computing device may determine characteristics of received user inputs and modify values of a spatial model based on the determined characteristics, which may thereby enable a user to provide faster text input. In this way, a computing device implementing techniques of the disclosure may modify the location and/or area of a character's associated input zone to account for speed and inaccuracy based on the determined characteristics. Such techniques may thereby reduce the need for a user to slowly and accurately select each character, and may provide a more error-tolerant process for inputting text. In this way, techniques of the disclosure may modify various values of a spatial model and use the spatial model along with a language model to correct, complete, and/or predict text input based on previously inputted text.

In one aspect of the present disclosure, a computing device (e.g., a mobile phone, a tablet computer, etc.) may modify values of the spatial model based on prior text input. The computing device may also determine a correction, completion, and/or prediction of text using the spatial model in conjunction with a language model. In one example, a computing device may receive a sequence of indications of user input in response to a user tapping a number of locations at a presence-sensitive display. In some instances, the indications of user input may not accurately align with the locations of keys displayed as part of the graphical keyboard. As such, after receiving an indication of user input, the computing device may modify one or more values of the spatial model based on characteristics (e.g., the input speed, the location of the inputs, etc.) associated with the indications of user input. The computing device may subsequently employ the modified spatial model to determine text corresponding to subsequent inputs. The computing device may use the modified spatial model in conjunction with a language model to determine characters, completion of words, and/or predictions of words intended by subsequent user inputs. Modifying the spatial model based on received inputs may allow the computing device to more accurately determine, for example: which characters are more probable to be selected by a user in subsequently received inputs, which word is more probable given a selection of one or more characters, and which characters and/or words are more probable to be selected next.

The techniques of the present disclosure may improve the ease with which a user can input text at a computing device. For example, using techniques of this disclosure, a computing device may receive indications of tapping gestures and/or swiping gestures at a graphical keyboard at increased speeds (i.e., more characters per second) to enter text. In response to such indications, the computing device may output one or more characters, character strings, etc., for display at a presence-sensitive display. The user may review the characters and/or character strings displayed by the computing device, as well as any corrections or completions of the word (i.e., a candidate word) that are outputted for display by the computing device. In some examples, the computing device may commit a candidate word as text input in response to receiving an indication of user input that the user is satisfied with the correction and completion. For example, the computing device may receive an indication of a gesture at the graphical keyboard to select a space key and commit the candidate word. Furthermore, once the user has entered text, the computing device may output one or more predictions of future text for review by the user. In this way, the computing device may enable the user to select from the predictions instead of requiring the user to manually enter text through tapping or sliding gestures at the graphical keyboard.

FIG. 1 is a block diagram illustrating an example computing device 102 and graphical user interfaces (GUIs) for providing text input, in accordance with one or more aspects of the present disclosure. In some examples, computing device 102 may be associated with user 150. A user associated with a computing device may interact with the computing device by providing various user inputs into the computing device. In some examples, user 150 may have one or more accounts with one or more services, such as a social networking service and/or telephone service, and the accounts may be registered with computing device 102.

Examples of computing device 102 may include but are not limited to, portable or mobile devices such as mobile phones (including smartphones), laptop computers, desktop computers, tablet computers, smart television platforms, personal digital assistants (PDAs), servers, mainframes, etc. As shown in the example of FIG. 1, computing device 102 may be a smartphone. Computing device 102, in some examples, can include user interface (UI) device 104, UI module 106, gesture module 108, spatial model 110, language model 111, and application modules 112A-112N (collectively "application modules 112"). Other examples of computing device 2 that implement techniques of the present disclosure may include additional components not shown in FIG. 1.

Computing device 2 may include UI device 104. In some examples, UI device 104 is configured to receive tactile, audio, or visual input. Examples of UI device 104 may include a touch-sensitive and/or presence-sensitive display, or any other type of device for receiving user input. UI device 104 may output content such as GUIs 114 and 116 for display. In the example of FIG. 1, UI device 104 may be a presence-sensitive display that can display a GUI and receive user input though capacitive, inductive, or optical detection at or near the presence-sensitive display.

As shown in FIG. 1, computing device 102 may include UI module 106. UI module 106 may perform one or more functions to receive input, such as user input, and send indications of such input to other components associated with computing device 102, such as gesture module 108. UI module 106 may also receive data from components associated with computing device 102 such as gesture module 108 or application modules 112. Using the data received, UI module 106 may cause other components associated with computing device 102, such as UI device 104, to provide output based on the data. For instance, UI module 106 may receive data from one of application modules 112 to display GUIs 114 and 116.

UI module 106 may be implemented in various ways. For example, UI module 106 may be implemented as a downloadable or pre-installed application or "app." In another example, UI module 106 may be implemented as part of a hardware unit of computing device 106. In another example, UI module 106 may be implemented as part of an operating system of computing device 102.

Computing device 102, in some examples, may include gesture module 108. Gesture module 108 may include functionality to perform a variety of operations on computing device 102. For instance, gesture module 108 may use a spatial model in conjunction with a language model to determine text input in accordance with the techniques described herein. Gesture module 108 may be implemented in various ways. For example, gesture module 108 may be implemented as a downloadable or pre-installed application or "app." In another example, gesture module 108 may be implemented as part of a hardware unit of computing device 102. In another example, gesture module 108 may be implemented as part of an operating system of computing device 102.

Gesture module 108, in some examples, may be configured to receive gesture data from UI module 106 and determine text from the gesture data. In some examples, gesture module 108 can determine one or more characteristics associated with a gesture, such as the Euclidean distance between a location of a touch gesture and a key location, the rate at which a plurality of gestures are received, the Euclidean distance between two points on a gesture path, the length of a gesture path, the direction of a gesture, the curvature of a gesture path, and maximum curvature of a gesture between points on the gesture path, speed of the gesture, etc. Gesture module 108 may send text determined from the gesture data to other components of computing device 102, such as application modules 112, UI module 106, etc. For instance, gesture module 108 may send text determined from the received gesture data to UI module 106 that causes UI device 104 to display text as shown in GUI 114.

As shown in FIG. 1, computing device 102 may include spatial model 110. Spatial model 110 may store key data corresponding to one or more keys or "soft buttons" of a graphical keyboard (i.e., in contrast to a unique key that is declared and assigned to a data entity). Key data may include, in some examples, statistical values associated with a key of a keyboard, location values associated with the key in the keyboard, a mathematical definition of a key, etc. Spatial model 110 may be stored in one of a range of data structures, such as an array, a list, a structured file such as a file encoded using eXtensible Markup Language (XML), etc.

In one example, spatial model 110 may include values for a bivariate Gaussian distribution of touch points for each key of a graphical keyboard. In other examples, spatial model 110 may include any other means of defining an area of an input device to be associated with a key of a graphical keyboard, such as values defining the location and size of the key, values defining the location and space between the keys, etc. In the context of bivariate Gaussian models, the mean values, standard deviation values, and/or co-variance values for each key may be preset or learned from data. Such values for a key in spatial model 110 may also be adjusted based at least in part on the proceeding inputted character. For instance, spatial model 110 may receive modification data from other components of computing device 102, such as gesture module 108, or a network device to change one or more values associated with a key. That is, gesture module 108 or other components may modify the values or definitions associated with one or more keys that are stored in spatial model 110 to more accurately correct, complete, and/or predict text.

Computing device 102, in some examples, includes language model 111. Language model 111 may include a lexicon. In some examples, a lexicon may include a listing of words and may include additional information about the listed words, such as relationships between words, grammar contexts, frequency of use, etc. A lexicon may be represented by a range of data structures, such as an array, a list, and/or a tree. For example, language model 111 may include a lexicon stored in a trie data structure. A lexicon trie data structure may contain a plurality of nodes, each node may represent a letter. The first node in a lexicon trie may be called the entry node, which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag, which indicates that the node is a terminal node. Each terminal node of a lexicon trie may indicate a complete word (e.g., a candidate word). The letters indicated by the nodes along a path of nodes from the entry node to a terminal node may spell out a word indicated by the terminal node. In some examples, language model 111 may be a default dictionary installed on computing device 102. In other examples, language model 111 may include multiple sources of lexicons, which may be stored at computing device 102 or stored at one or more remote computing devices and are accessible to computing device 102 via one or more communication channels. In some examples, language model 111 may be implemented in the firmware of computing device 102.

Language model 111 may include language model frequency information such as word-level n-gram language models or dictionaries. An n-gram language model may provide a probability distribution for an item $x_i$ (e.g., a letter or word) in a contiguous sequence of items based on the previous items in the sequence (i.e., $P(x_i | x_{i-(n-1)}, \ldots, x_{i-1})$).

For instance, a word-level bigram language model (an n-gram language model where n=2) may provide a probability that the word "snow" follows the word "white".

Techniques of the present disclosure may improve the speed and accuracy with which a user can enter text into a computing device. Using techniques of this disclosure, a computing device may receive an indication of one or more gestures performed by a user to indicate text. As the user performs the gesture or gestures, the computing device may modify the spatial model based on the gesture or gestures received. The computing device may employ a unified model including the spatial model and the language model to incrementally determine the text input indicated by the gesture or gestures. By incrementally decoding the gestures as they are being performed and updating the spatial model appropriately, the computing device may more accurately determine text correction, text completion, and/or text prediction with reduced post-gesture entry processing time. Moreover, by enabling the user to easily enter more accurate text with less error, techniques of this disclosure enable the user to increase the rate at which text is entered. Techniques of the disclosure are now further described herein with respect to components of FIG. 1.

As shown in the example of FIG. 1, GUI 114 may be a user interface generated by UI module 106 that allows user 150 to interact with computing device 102. GUI 114 may include graphical content. Graphical content, generally, may include text, images, a group of moving images, etc. As shown in FIG. 1, graphical content may include graphical keyboard 128, text entry area 126, and word suggestion areas 122A-C (collectively "word suggestion areas 122"). Graphical keyboard 128 may include a plurality of keys, such as "R" key 123A, "E" key 123B, "P" key 123C, and space key 123D. In some examples, each of the plurality of keys included in graphical keyboard 128 represents a single character. In other examples, one or more of the plurality of keys included in graphical keyboard 128 may respectively represent a group of characters selected based on a plurality of modes.

In some examples, text entry area 126 may include characters or other graphical content that are included in, for example, a text-message, a document, an e-mail message, a web browser, or any other situation where text entry is desired. For instance, text entry area 126 may include characters or other graphical content that are selected by user 150 via gestures performed at UI device 104. As shown in GUI 114, text entry area 126 includes inputted text 118 and predicted text 120. Inputted text 118 may represent text already inputted by user 150 (e.g., via tapping or sliding gestures).

UI module 106 may cause UI device 104 to display graphical keyboard 128 and detect a series of tap gestures performed at UI device 104. A tap gesture may include an input unit (e.g., user 3's finger, a pen, a stylus, etc.) moving into proximity with UI device 104 such that the input unit is temporarily detected by UI device 4 and then moving away from UI device 104 such that the input unit is no longer detected. In other examples, UI device 104 may detect a sliding gesture. Sliding gestures may be continuous motion gestures that include a motion of the input unit from a first location of UI device 104 to a second location of UI device 104 such that the gesture performed from the first location to the second location is detected by UI device 104 throughout the performance of the gesture.

User 150 may perform tap gestures 124A, 124B, 124C, and 124D (collectively "tap gestures 124") to select a number of keys of the plurality of keys. UI module 106 may detect each of tap gestures 124 as performed at UI device 104. Gesture module 108 may receive data indicating each of tap gestures 124 from UI module 106. For instance, gesture module 108 may receive a coordinate pair indicating a location of UI device 104 at which a gesture was received. In response to receiving an indication of a tap gesture, gesture module 108 may determine one or more characteristics associated with the tap gesture. For instance, in response to receiving an indication of tap gesture 124A, gesture module 108 may access spatial model 110 to retrieve statistical location values (e.g., mean or average values of the bivariate Gaussian distribution associated with the key) associated with "R" key 123A, "E" key 123B, and others. Gesture module 108 may determine the Euclidian distance between the location of tap gesture 124A and each of the retrieved statistical locations. Other examples of determined characteristics include an input speed (e.g., of a sliding gesture or multiple tap gestures), a duration, a pressure, and others.

Based at least in part on the determined characteristics, gesture module 108 may modify values of spatial model 110. In some examples, gesture module 108 may determine characteristics and modify spatial model 110 after each indication is received. In other examples, gesture module 108 may determine characteristics and modify spatial model 110 at other intervals, such as after multiple indications are received. Gesture module 108 may modify values of spatial model 110 in order to improve determination for a specific character. That is, gesture module 108 may learn from received tap gestures. For instance, after receiving tap gesture 124A, gesture module 108 may modify the statistical location value of "R" key 123A as defined in spatial model 110. Subsequently, gesture module 108 may use the updated statistical location of "R" key 123A to calculate Euclidian distances between, e.g., first and second locations of a gesture and/or a first location of a gesture and a location associated with a given key.

Additionally, gesture module 108 may modify values of spatial model 110 in order to improve the determination for specific user inputs (e.g., the next user input to be received). For example, after receiving an indication of tap gesture 124A, gesture module 108 may decrease a vertical standard deviation value associated with "E" key 123B and/or increase a horizontal standard deviation value associated with "E" key 123B. Modifications to spatial model 110, in some examples, may be temporary. That is, gesture module 108 may return the modified values of spatial model 110 to their original state. In other examples, modifications may not be returned to their previous states. In either case, gesture module 110 may change various values of spatial model 110 associated with keys of a displayed graphical keyboard, to more accurately process subsequently received gestures.

Gesture module 108 may employ spatial model 110, as modified, in conjunction with language model 111 to determine text input. Based at least in part on a received indication of a gesture, gesture module 108 may use spatial model 110 to determine a set of candidate strings. Gesture module 108 may determine a set of candidate strings upon receiving a first indication of a tap gesture (e.g., an indication of tap gesture 124A). As gesture module 108 receives subsequent indications, gesture module 108 may modify spatial model 110, and use spatial model 110, as modified, to update the set of candidate strings based on the received indications (e.g., adding candidate strings, modifying candidate strings, removing candidate strings, etc.).

Candidate strings may represent hypotheses based on user 150's input when performing tap gestures 124. A candidate string may contain a string of characters, a single word, or multiple words as part of a phrase. For instance, as gesture module 108 begins receiving indications correlating to tap inputs 124, gesture module 108 may create a set of character strings and, as gesture module 108 receives subsequent indications, gesture module 108 may modify spatial model 110 based on the indication. Gesture module 108 may then employ spatial model 110, as modified, to add, remove, and/or update characters in one or more of the candidate strings.

Each candidate string may have an associated physical cost value. The physical cost value may be based at least in part on spatial model 110, and may represent the likelihood (e.g., a probability) that the associated candidate string represents the user's intended input. In the example of FIG. 1, a lower physical cost value may indicate a higher likelihood that the associated candidate string represents the user's intended input. In other implementations, however, a higher physical cost value may indicate a higher likelihood. In any case, the physical cost value of a candidate string may be the sum of the physical cost values for each character in the candidate string.

In the example of FIG. 1, after receiving an indication of tap input 124A, gesture module 108 may temporarily increase the horizontal standard deviation value associated with "E" key 123B in accordance with techniques of the present disclosure. Consequently, the physical cost value of tap input 124B representing an "e" character may be lower (i.e., better) than the physical cost value of tap input 124B representing a "w" character. Responsive to receiving indications of tap inputs 124, gesture module 108 may perform additional modifications to spatial model 110. Gesture module 108 may use spatial model 110 to determine a set of candidate strings including, for example, the strings "revo", "rwvo", "reco", "rwco", "revp", "rwvp", and others. By employing a modifiable version of spatial model 110, gesture module 108 may, for example, determine that the candidate strings beginning with "re", such as "revo", have a lower physical cost value than the candidate strings beginning with "rw", such as "rwvp". That is, despite the fact that tap gesture 124B may be equidistant between the "W" key and "E" key 123B, due to the modifications of spatial model 110, gesture module 108 may determine that "revo", "reco", and "revp" have lower associated physical cost values. Gesture module 108 may determine that, given the received indications of tap gestures 124, the candidate string "revp" has the lower physical cost value (and therefore a higher likelihood in the current example).

Gesture module 108 may employ a lexicon of language model 111 to determine one or more candidate words based at least in part on the candidate strings. Candidate words may be corrections and/or completions of determined candidate strings. Gesture module 108 may compare a candidate string with words contained in the lexicon of language model 111 in order to determine likely candidate words, based at least in part on the sequence of characters contained in the candidate string. For example, gesture module 108 may compare the candidate strings "revo", "rwvo", "reco", "rwco", "revp", "rwvp" to words in language model 111. For some candidate strings, such as "revo" or "reco", gesture module 108 may determine one or more candidate words, such as "revolution", "revolutionary", "revolt", "record", and "recompense", among others. In some examples, gesture module 108 may determine candidate words after user 150 indicates a completion of tap inputs 124 (e.g., a pause in performing tap inputs). In other examples, gesture module 108 may incrementally determine candidate words as indications of tap inputs 124 are received from UI module 106.

In examples where a candidate string does not correspond to a beginning portion (e.g., prefix) of any word in the lexicon with a sufficient probability or where the candidate string itself is a word in the lexicon, gesture module 8 may determine that the candidate string is a candidate word itself (e.g., a candidate word "revp" for the candidate string "revp"). That is, the lexicon of language model 111 may not contain a word which begins with the prefix "revp". In other examples, candidate words may include more characters, fewer characters, and/or different characters than the candidate string. For instance, a candidate word may contain fewer characters than the candidate string when gesture module 8 determines that the candidate string may contain an error (e.g., a candidate word of "dog" for the candidate string "doig").

Words in the lexicon of language module 111 may be associated with a frequency value. The frequency value may represent the prevalence of the word in common usage. In some examples, the frequency value may be a predefined, static value stored in language model 111. In other examples, frequency values may be dynamic and modifiable by, for instance, other components of computing device 102, other devices, or based on past user input behavior. A higher frequency value may correspond to the associated word being used more often in the language and, thus, the associated word may have a higher likelihood of being a correct prediction of the user's input.

In some examples, gesture module 108 may employ a word-level n-gram language model in language model 111 to determine candidate words based at least in part on previously entered text. For instance, gesture module 108 may use a word-level bigram language model contained in language model 111. The word-level bigram language model may provide frequency values associated with word pairs. Gesture module 108 may determine candidate words based at least in part on the word-level frequency values. That is, gesture module 108 may determine candidate words based at least in part on inputted text for the current word as well as inputted text from a previous word or words. In some examples, gesture module 108 may determine candidate words based on inputted text from a previous word, or words without requiring any inputted text for the current word. That is, gesture module 108 may predict a candidate word based on a word-level language model and/or a lexicon contained within language model 111, without utilizing spatial model 110.

In the example of FIG. 1, gesture module 108 may determine that "revolution" has a higher likelihood of representing user 150's intended input than "revolutionary", "revolt", "record", "recompense", etc. That is, the lexicon of language model 111 may indicate that "revolution" is more frequently used in the language and/or the word-level bigram language model of language model 111 may indicate that "French revolution" is more frequently used, and thus "revolution" is more likely to appear in a user's text input. Consequently, though the candidate string "revp" may have a lowest physical cost value (as determined using spatial model 110), gesture module 108 may determine that "revo" has the highest likelihood of representing user 150's intended input because "revp" is not a prefix of any word in language model 111. Furthermore, because the candidate word "revolution", resulting from the candidate string "revo", has a highest frequency value of those candidate words based on the candidate string "revo", gesture module 108 may determine that "revolution" has the highest likelihood of representing user 150's intended future input.

Gesture module 108 may cause UI device 104 to display the candidate word having the highest probability as a soft commit word in text entry area 126. A soft commit word may function as a placeholder and, if user 150 provides an input to select the soft commit word, gesture module 108 sends the soft commit word as text to, for example, application modules 112. In response to receiving data indicating a soft commit word, UI device 104 may display the soft commit word as predicted text 120. As shown in FIG. 1, UI module 106 may receive data indicating the soft commit word "revolution", and UI device 104 may display the soft commit word as predicted text 120 such that the underlying candidate string, "revo", is followed immediately by the remainder of the determined candidate word, "lution", as included in GUI 114. In some examples, UI module 106 may cause the entered characters and the predicted portion of a candidate word or candidate phrase to be displayed in different shades, formatting, or colors in order to indicate to the user what text has already been inputted by gestures, and what text is part of the prediction.

In some examples, gesture module 108 may also cause UI device 104 to output one or more candidate words as auto-completion suggestions. Auto-completion suggestions may be outputted to word suggestion areas 122. Gesture module 108 may send to UI module 106 those candidate words that have been determined to have higher probabilities than other candidate words, thereby indicating the more likely intended input of user 150. For instance, UI device 104 may output the two candidate words having the second and third highest probabilities in word suggestion areas 122B and 122C. For example the second most probable candidate word may be located at the center of GUI 114, with the less probable candidate word located on the right side of GUI 114.

Gesture module 108 may also cause UI device 104 to output one or more candidate strings as auto-completion suggestions. For example, gesture module 108 may send to UI module 106 the candidate string having the lowest physical cost value as determined using spatial model 110. That is, gesture module 108 may output an auto-completion suggestion which allows user 150 to choose the string most likely to represent user 150's literal input. In the example of FIG. 1, gesture module 108 may determine, after receiving data corresponding to tap gestures 124, that the candidate words with the second and third highest probabilities of representing user 150's intended input are "revolutionary", and "revolt". As previously stated, gesture module 108 may determine that the candidate string having the lowest physical cost value is "revp." Based on these determinations, gesture module 108 may send data to UI module 106, and the candidate words and candidate string may be outputted at UI device 104 as shown in GUI 114. Thus, after user 150 has performed tap gestures 124, UI device 104 may display GUI 114.

In some examples, responsive to user 150's selection of an auto-completion suggestion (e.g., in one of word suggestion areas 122) or acceptance of the soft commit word included in GUI 114, gesture module 108 may send data corresponding to the selected auto-completion suggestion and/or the selected soft commit word to other components associated with device 102 as text (i.e., a hard commit word). That is, gesture module 108 may determine a hard commit word in response to user 150's selection of the soft commit word or an auto-completion suggestion. In other examples, gesture module 108 may determine a hard commit word without user 150's selection, such as when there is a high likelihood that a candidate word is the intended input of user 150. Generally, in the present example, a hard commit word may refer to a word and/or character string that is selected by the user and which may have previously been outputted for display as a soft commit word.

Other examples of possible situations include gesture module 108 determining a hard commit word when user 150 includes specific actions during the performance of a gesture, when user 150 performs a specific gesture, etc. In some examples, after sending text input as a hard commit word to an application, gesture module 108 may discard or otherwise cease to store the determined set of candidate strings. That is, after determining a hard commit word, any subsequent input may cause gesture module 108 to start anew, determining a new set of candidate strings. In this manner, gesture module 108 may control data associated with user inputted gestures and text prediction until a trigger of a hard commit word occurs, at which point, gesture module 108 may send the hard commit word to other components of computing device 102 (e.g., one of application modules 112).

In the example of FIG. 1, when presented with GUI 114 (i.e., after performing tap gestures 124), user 150 may perform tap gesture 125 to select space key 123D. User 150 may perform tap gesture 125 as an indication that he or she is satisfied with predicted text 120 as displayed in GUI 114. In response to user 150 performing tap gesture 125 at UI device 104, UI module 106 may receive data corresponding to tap gesture 125. UI module 106 may provide an indication of the tap gesture to gesture module 108.

In accordance with one or more techniques of the present disclosure, gesture module 108 may determine one or more characteristics associated with tap gesture 125 and may modify spatial model 110 accordingly. Gesture module 108 may use spatial model 110, as modified, to determine the most likely key intended by user 150 in his or her performance of tap gesture 125. Based on the received indication of tap gesture 125 (e.g., the location of the performed gesture), gesture module 108 may determine that the most likely key is associated with a space character. Responsive to the determination, gesture module 108 may determine a hard commit. That is, gesture module 108 may send predicted text 120 to other components associated with computing device 102, such as UI device 106 or one of applications 112.

In response to receiving tap gesture 125, components associated with computing device 102 may cause UI device 104 to display GUI 116. As shown in FIG. 1, GUI 116 includes text entry area 126 and graphical keyboard 128. Text entry area 126 includes inputted text 130 and predicted text 132. In other words, after providing an input that causes computing device 102 to perform a hard commit by entering a space character, UI device 104 may present user 150 with a prediction of future input without performing any further gestures.

Predicted text 132 may be a prediction of user 150's future input based at least in part on language model 111. That is, in response to performing a hard commit, gesture module 108 may use spatial model 110 and language model 111 to determine a set of candidate words in accordance with one or more aspects of the present disclosure. However, in the example of FIG. 1, there may be no tap inputs or sliding inputs for which spatial model 110 may be used. Consequently, gesture module 108 may determine the candidate words based on language model 111 alone.

For instance, gesture module 108 may use a word-level bigram dictionary of language model 111 to determine the most likely word to follow "revolution". In other examples, the language model used may be a trigram or a 4-gram dictionary. In such instance, gesture module 108 may determine the most likely word to follow "French revolution" or "The French revolution" respectively. In the example of FIG. 1, gesture module 108 may access the word-level bigram dictionary within language model 111 and determine that the pair of words "revolution timeline" has the highest frequency value, out of all pairs beginning with the word "revolution". Based on this determination, gesture module 108 may send cause UI device 104 to output "timeline" as a soft commit. Gesture module 108 may, in some examples, provide other candidate words in word suggestion areas 122. In other words, after causing a hard commit by selecting space key 123D, user 150 may be presented with one or more options predicting future text input without being required to enter any further input.

In some examples, techniques of the present disclosure provide for improved correction, completion, and/or prediction of text input using a graphical keyboard. Techniques of this disclosure may also increase input accuracy by modifying a spatial model used to determine likely text input, and using the modified spatial model to determine text inputted from gestures. In this way, techniques of this disclosure may reduce the time requirement of text input by allowing users to input text using one or more gestures and providing users with corrections, completions, and/or predictions of text input, without requiring the user to pay close attention to gesture accuracy.

Figure 2:
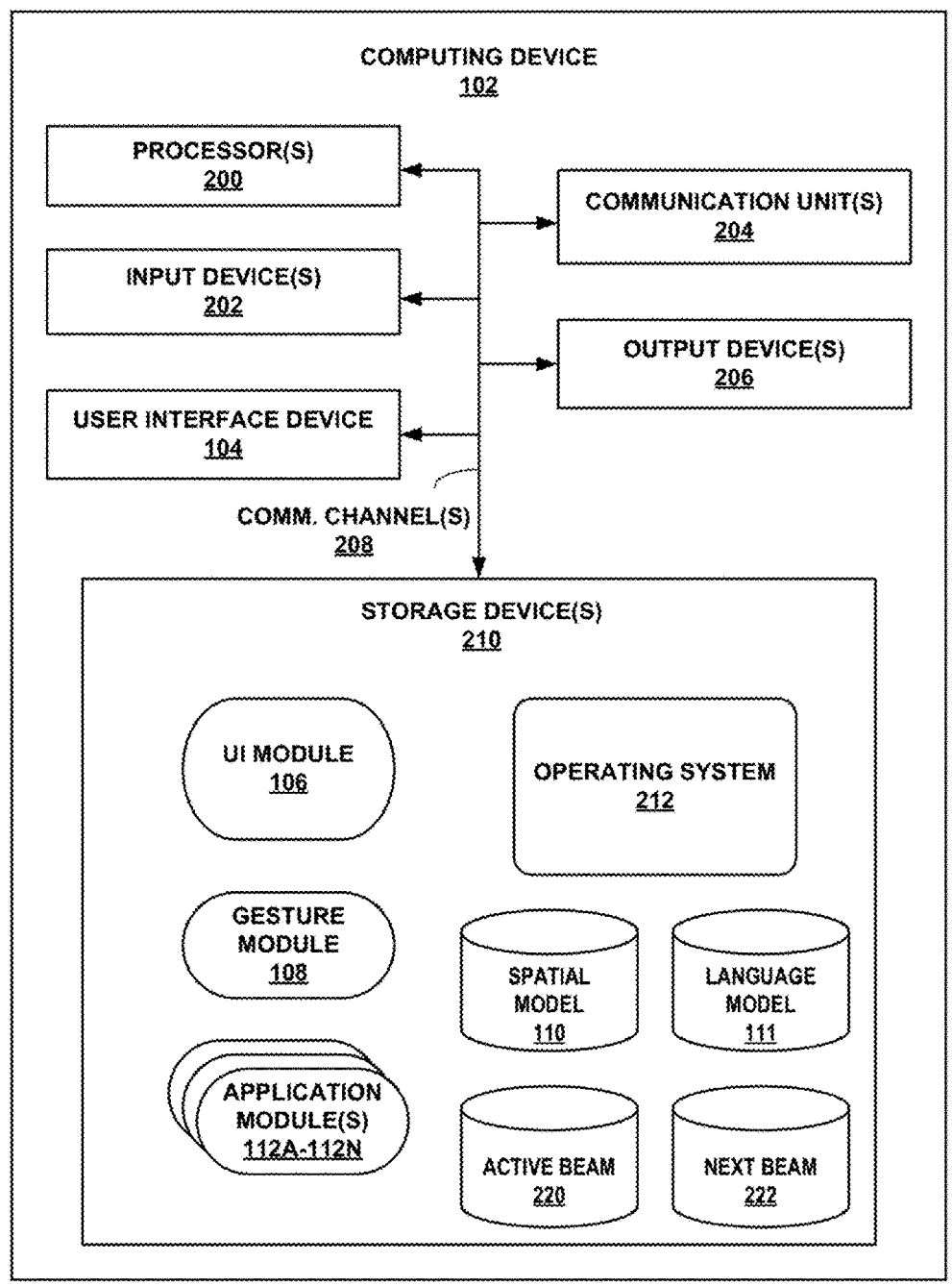
FIG. 2 is a block diagram illustrating further details of an example computing device for providing text input, in accordance with one or more aspects of the present disclosure.

FIG. 2 is a block diagram illustrating an example computing device 102 for providing text input, in accordance with one or more aspects of the present disclosure. FIG. 2 illustrates only one particular example of computing device 102, and many other examples of computing device 102 may be used in other instances.

As shown in the specific example of FIG. 2, computing device 102 includes one or more processors 200, one or more input devices 202, one or more communication units 204, one or more output devices 206, one or more storage devices 210, and user interface (UI) device 104. Computing device 102, in the specific example of FIG. 2, further includes operating system 212, UI module 106, gesture module 108, application modules 112, spatial model 110, language model 111, active beam 220, and next beam 222. Each of components 200, 202, 204, 206, 210, and 104 may be interconnected (physically, communicatively, and/or operatively) for inter-component communications. As one example in FIG. 2, components 200, 202, 204, 206, 210, and 104 may be coupled by one or more communication channels 208. In some examples, communication channels 208 may include a system bus, network connection, interprocess communication data structure, or any other channel for communicating data. Modules 106, 108, and 112, as well as operating system 212, spatial model 110, language model 111, active beam 220, and next beam 222 may also communicate information with one another as well as with other components in computing device 102.

Processors 200, in one example, are configured to implement functionality and/or process instructions for execution within computing device 102. For example, processors 200 may be capable of processing instructions stored in storage devices 210. Examples of processors 200 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 210 may be configured to store information within computing device 102 during operation. Storage devices 210, in some examples, are described as a computer-readable storage medium. In some examples, storage devices 210 are a temporary memory, meaning that a primary purpose of storage devices 210 is not long-term storage. Storage devices 210, in some examples, are described as a volatile memory, meaning that storage devices 210 do not maintain stored contents when the computer is turned off. Examples of volatile memories include random access memories (RAM), dynamic random access memories (DRAM), static random access memories (SRAM), and other forms of volatile memories known in the art. In some examples, storage devices 210 are used to store program instructions for execution by processors 200. Storage devices 210, in one example, are used by software or applications running on computing device 102 (e.g., modules 106, 108, 112, etc.) to temporarily store information during program execution.

Storage devices 210, in some examples, also include one or more computer-readable storage media. Storage devices 210 may be configured to store larger amounts of information than volatile memory. Storage devices 210 may further be configured for long-term storage of information. In some examples, storage devices 210 include non-volatile storage elements. Examples of such non-volatile storage elements include magnetic hard discs, optical discs, floppy discs, flash memories, or forms of electrically programmable memories (EPROM) or electrically erasable and programmable memories (EEPROM).

Computing device 102, in some examples, also includes one or more communication units 204. Computing device 102, in one example, utilizes communication unit 204 to communicate with external devices via one or more networks, such as one or more wireless networks. Communication unit 204 may be a network interface card, such as an Ethernet card, an optical transceiver, a radio frequency transceiver, or any other type of device that can send and receive information. Other examples of such network interfaces may include Bluetooth, 3G and WiFi radio components as well as Universal Serial Bus (USB). In some examples, computing device 102 utilizes communication unit 204 to wirelessly communicate with an external device such as other instances of computing device 102 of FIG. 1, or any other computing device.

Computing device 102, in one example, also includes one or more input devices 202. Input device 202, in some examples, is configured to receive input from a user through tactile, audio, or video feedback. Examples of input device 202 include a presence-sensitive display, a mouse, a keyboard, a voice responsive system, video camera, microphone or any other type of device for detecting a command from a user. In some examples, a presence-sensitive display includes a touch-sensitive screen.

One or more output devices 206 may also be included in computing device 102. Output device 206, in some examples, is configured to provide output to a user using tactile, audio, or video stimuli. Output device 206, in one example, includes a presence-sensitive display, a sound card, a video graphics adapter card, or any other type of device for converting a signal into an appropriate form understandable to humans or machines. Additional examples of output device 206 include a speaker, a cathode ray tube (CRT) monitor, a liquid crystal display (LCD), or any other type of device that can generate intelligible output to a user.

In some examples, UI device 104 may include functionality of input device 202 and/or output device 206. In the example of FIG. 2, UI device 104 may be a presence-sensitive display. In some examples, a presence-sensitive display may detect an object at and/or near the screen of the presence-sensitive display. As one example range, a presence-sensitive display may detect an object, such as a finger or stylus that is within 2 inches or less of the physical screen of the presence-sensitive display. In another example range, a presence-sensitive display may detect an object 6 inches or less from the physical screen of the presence-sensitive display. Other exemplary ranges are also possible. The presence-sensitive display may determine a location (e.g., an (x,y) coordinate) of the presence-sensitive display at which the object was detected. The presence-sensitive display may determine the location of the display selected by a user's finger using capacitive, inductive, and/or optical recognition techniques. In some examples, the presence-sensitive display provides output to a user using tactile, audio, or video stimuli as described with respect to output device 206.

Computing device 102 may include operating system 212. Operating system 212, in some examples, controls the operation of components of computing device 102. For example, operating system 212, in one example, facilitates the communication of modules 106, 108, and 112 with processors 200, communication units 204, storage device 210, input devices 202, and output devices 206. Modules 106, 108, and 112 may each include program instructions and/or data that are executable by computing device 102. As one example, UI module 106 may include instructions that cause computing device 102 to perform one or more of the operations and actions described in the present disclosure.

In the example of FIG. 2, computing device 102 may include spatial model 110. As previously described in FIG. 1, spatial model 110 may store key data corresponding to one or more keys "or soft buttons" of a graphical keyboard (i.e., in contrast to a unique key that is declared and assigned to a data entity). Key data may include, in some examples, statistical values associated with a key of a keyboard, location values associated with a key of a keyboard, a mathematical definition of a key, etc. Spatial model 110 may be stored in one of a range of data structures, such as an array, a list, a structured file such as a file encoded using eXtensible Markup Language (XML), etc.

In one example, spatial model 110 may include values for a bivariate Gaussian distribution of touch points for each key of a graphical keyboard. The mean values, standard deviation values, and/or co-variance values for each key may be preset or learned from data. Such values for a key in spatial model 110 may also be adjusted based at least in part on the proceeding inputted character. For instance, spatial model 110 may receive modification data from other components of computing device 102, such as gesture module 108, or a network device to change one or more values associated with a key. That is, gesture module 108 or other components may modify the values or definitions associated with one or more keys that are stored in spatial model 110 to more accurately correct, complete, and/or predict text input.

Computing device 102, in some examples, includes language model 111. Language model 111 may include a lexicon. In some examples, a lexicon may include a listing of words and may include additional information about the listed words, such as relationships between words, grammar contexts, frequency of use, etc. A lexicon may be represented by a range of data structures, such as an array, a list, and/or a tree. For example, language model 111 may include a lexicon stored in a trie data structure. A lexicon trie data structure may contain a plurality of nodes, each node may represent a letter. The first node in a lexicon trie may be called the entry node, which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag, which indicates that the node is a terminal node. Each terminal node of a lexicon trie may indicate a complete word (e.g., a candidate word). The letters indicated by the nodes along a path of nodes from the entry node to a terminal node may spell out a word indicated by the terminal node. In some examples, language model 111 may be a default dictionary installed on computing device 102. In other examples, language model 111 may include multiple sources of lexicons, which may be stored at computing device 102 or stored at one or more remote computing devices and are accessible to computing device 102 via one or more communication channels. In some examples, language model 111 may be implemented in the firmware of computing device 102.

As previously described in FIG. 1, language model 111 may include language model frequency information such as word-level n-gram dictionaries. An n-gram dictionary may provide a probability distribution for an item $x_i$ (e.g., a letter or word) in a contiguous sequence of items based on the previous items in the sequence (i.e., $P(x_i|x_{i-(n-1)}, \ldots, x_{i-1})$). For instance, a word-level bigram dictionary (an n-gram language model where n=2) may provide a probability that the word "snow" follows the word "white".

Computing device 102 may include active beam 220. Active beam 220, in some examples, is configured to store one or more candidate strings (e.g., as tokens) generated by gesture module 108. Active beam 220 may be included within storage devices 210. Active beam 220 may be represented by a range of data structures and/or software objects, such as an array object, a list object, a database, a table, a tree, etc. Active beam 220 is further described in the description of FIG. 5, below.

Computing device 102 may also include next beam 222. Next beam 222, in some examples, is configured to store one or more candidate strings (e.g., as tokens) generated by gesture module 108. Next beam 222 may be included within storage devices 210. Next beam 222 may be represented by a range of data structures and/or software objects, such as an array object, a list object, a database, a table, a tree, etc. Next beam 222 is further described in the description of FIG. 5, below.

In accordance with techniques of the present disclosure, computing device 102 may output a graphical keyboard comprising a plurality of keys at output device 206. User 150 may perform a series of tap gestures to select a number of keys of the plurality of keys at input device 202. In response to user 3 performing a tap gesture, input device 202 may detect the user input, such as tap gesture 124A of FIG. 1, which may be received by UI module 106. Gesture module 108 may receive an indication of the tap gesture from UI module 106. In some examples, UI module 106 may send an indication of each tap gesture as it is received. In other examples, UI module 106 may send indications at different intervals.

Gesture module 108 may determine characteristics associated with the received indications. Gesture module 108 may, in various examples, determine a Euclidian distance between the location of a received tap gesture and one or more keys of the graphical keyboard, determine a speed (e.g., in characters per second) at which tap gestures are being performed, and/or determine the size of contact area between an input unit (e.g., user 150's finger) and input device 202. Based at least in part on the determined characteristics, gesture module 108 may modify one or more values of spatial model 110. For instance, gesture module 108 may modify a vertical or horizontal standard deviation value associated with keys of the graphical keyboard, based at least in part on the physical location of the preceding tap input. In another example, gesture module 108 may modify a statistical location of a key to include the physical location of the preceding tap input. In other words, gesture module 108 may modify spatial model 110 based on a received tap input, in order to more accurately determine text from subsequent user inputs.

Gesture module 108 may use spatial model 110, as modified, as well as language model 111 to determine one or more candidate strings (e.g., as tokens) by determining, for each received tap gesture, a composite cost value for each of at least two keys of the plurality of keys, and comparing the respective composite cost values for each of at least two keys, as further described below. A composite cost value may include a physical cost value and a lexical cost value. While described in terms of tap gestures 124 of FIG. 1, gesture module 108 may determine characteristics, modify spatial model 110, and determine composite cost values based on other received gestures as well, such as sliding or swipe gestures.

In some examples, gesture module 108 may use spatial model 110, as modified, to determine respective physical cost values for each of at least two keys of the plurality of keys included in keyboard 128. Each of the respective physical cost values may represent a probability that a performed tap gesture indicates a key of the graphical keyboard. In some examples, the respective physical cost values may be based on characteristics, such as physical features of the tap gesture and/or physical and statistical features of the key. For instance, the respective physical cost values may be based on the physical location of the tap gesture with reference to a statistical location of the key, as stored in spatial model 110.

In some examples, lexical cost values may be based on language model 111. For instance, the respective lexical cost values may be based on the probability that a second key will be selected after a first key (e.g., the probability that the "o" key will be selected after the "c" key). In other examples, the respective lexical cost values may be based on the probability that a second candidate word will follow a first candidate word, or on the frequency values of language model 111. In certain examples, the keys for which respective lexical cost values are determined are selected based at least in part on language model 111. In some examples, the lexical cost values are lower where there is a greater likelihood that a tap gesture indicates a key. In other examples, the lexical cost values are higher where there is a greater likelihood that the tap gesture indicates a key.

In FIG. 2, as described with respect to FIG. 1, a user may intend to type "revolution". Gesture module 108 may determine a first composite cost value representing a probability that tap gesture 124A indicates "R" key 123A and a second composite cost value representing a probability that the tap gesture indicates "E" key 123B. Similarly, gesture module 108 may determine a third composite cost value representing a probability that tap gesture 124B indicates "E" key 123B and a fourth composite cost value representing a probability that tap gesture 124B indicates the "W" key (which may be another of the multiple keys in proximity to the location of the tap gesture performed near "E" key 123B). In this way, gesture module 108 may incrementally determine composite cost values, each representing a probability that a tap gesture indicates a key of the plurality of keys included in graphical keyboard 128. For instance, gesture module 108 may determine composite cost values representing probabilities that tap gestures indicate "P" key 123C, space key 123D, or other keys included in the plurality of keys, such as an "O" key that is in proximity to the tap gesture performed near "P" key 123C).

Gesture module 108 may compare the respective composite cost values for at least two keys of the plurality of keys to determine a combination of keys having a combined composite cost value that satisfies a threshold. A combined composite cost value for a combination of keys may represent a probability that tap gestures 124, together, indicate the combination of keys. Gesture module 108 may compare the respective composite cost values for at least two keys of the plurality of keys to determine which of the at least two keys is indicated by a tap gesture. Gesture module 108 may determine a combination of keys by determining which keys are indicated by each tap gesture.

In some examples, gesture module 108 may compare the combined composite cost value of a determined combination of keys with a threshold value. In some examples, the threshold value is the combined composite cost value of a different determined combination of keys. For instance, gesture module 108 may determine a first combination of keys having a first combined composite cost value and a second combination of keys having a second combined composite cost value. In such an instance, gesture module 108 may determine one or more candidate words based on the combination of keys with the lower combined composite cost value. In FIG. 2, as described with respect to FIG. 1, gesture module 108 may compare the determined respective composite cost values to determine a combination of keys (i.e., "R", "E", "V", and "P") having a combined composite cost value.

In response to receiving the tap gesture data from UI module 106, gesture module 108 may create a set of candidate strings. Each candidate string may be stored in a token. A token may be used to store a candidate string and append characters as subsequent indications of gestures are received by gesture module 108. As an example, gesture module 108 may create a token at the entry node of a lexicon which may be included in language model 111. In some examples, language module 111 may be implemented as a trie data structure. Each movable token may represent a partial alignment between a node in the lexicon (i.e., a partial word and/or phrase) and a received tap gesture. A token may advance to child nodes in the lexicon (i.e., next letters in the word) as gesture module 108 receives subsequent indications of tap gestures.

As described, a lexicon trie data structure may contain a plurality of nodes, each node representing a letter. Gesture module 108 may push the created token into active beam 220. Gesture module 108 may create a token copy on each of the token's child nodes. In the example of FIG. 2, gesture module 108 may create a first token copy on the child node representing the letter "R" (e.g., corresponding to a predicted key selection of "R" key 123A) and a second token copy on the child node representing the letter "E" (e.g., corresponding to a predicted key selection of "E" key 123B). Each of the tokens may include a single string of predicted characters.

For each tap gesture received, gesture module 108 may determine respective composite cost values for each of at least two keys of the plurality of keys. Each of the respective composite cost values may represent a probability that the tap gesture indicates a key of the plurality of keys. Gesture module 108 may determine a first composite cost value representing a probability that the first tap gesture indicates the node representing the letter "R" and a second composite cost value representing a probability that the tap gesture indicates the node representing the letter "E". In some examples, gesture module 108 may then update the token copy with the respective composite cost value and push the token copy in to next beam 222. Gesture module 108 may add the first composite cost value to the first token copy and the second composite cost value to the second token copy.

In some examples, gesture module 108 determines the respective cost values by including respective physical cost values and respective lexical cost values, as further described below. For instance, gesture module 108 may determine composite cost value by summing a physical cost value and a lexical cost value. In some examples, gesture module 108 may apply one or more weighting factors to the respective physical cost values by modifying specific values of spatial model 110. For example, by increasing a standard deviation value, stored in spatial model 110 and associated with a key, gesture module 108 may decrease the relative importance of the physical cost value as compared to the lexical cost value. By decreasing a standard deviation value, gesture module 108 may increase the relative importance of the physical cost value.

In some examples, gesture module 108 may weigh one or more of the lexical cost values higher than the respective physical cost values, such as where the tap gestures are detected at a high rate of speed. For instance, gesture module 108 may determine that a characteristic associated with a gesture (e.g., speed) satisfies one or more thresholds, such as when a global speed of the tap gestures is greater than or equal to a threshold value, less than or equal to a threshold value, etc. In response to the determination, gesture module 108 may weigh the lexical cost values of respective candidate strings higher than the respective physical cost values. In some examples, gesture module 108 may use statistical machine learning to adapt to the style of the user and modify the weighting over time. For instance, gesture module 108 may, in response to determining that the user is inaccurate while performing gestures, weigh the lexical cost values higher than the physical cost values.

In some examples, gesture module 108 may weigh physical cost values higher than the lexical cost values. Gesture module 108 may weigh the physical cost values higher than the lexical cost values where there is an indication that the lexical cost values may be unreliable, such as where the user has a history of entering words not included in the lexicon. In some examples, the relative weights may be estimated and optimized heuristically, such as by measuring accuracy from a plurality of computing devices.

In one example, gesture module 108 may determine a first physical cost value based on the Euclidian distance between the first tap gesture 124A and "R" key 123A, as shown in FIG. 1. In some examples, gesture module 108 may determine the physical cost values by comparing the Euclidian distance between a first tap gesture and a second tap gesture with the Euclidian distance between a first letter indicated by the first tap gesture and a second letter which may be represented by the second tap gesture. Gesture module 108 may determine that the cost value of the second letter is inversely proportional to the difference between the distances (i.e., that the second letter is more probable where the distances are more similar). That is, in some examples, physical cost values may be calculated on the geometry of the tap gestures instead of the location of the tap gestures. For instance, a smaller difference in distances may indicate a better likelihood that the second gesture was a selection of the second letter.

Gesture module 108 may also determine the composite cost values for respective keys by determining lexical cost values for each of the at least two keys of the plurality of keys. Each of the respective lexical cost values may represent a probability that a letter represented by a key of the plurality of keys is included in a candidate word based on the token. The lexical cost values may be based on language model 111. For instance, the lexical cost values may represent the likelihood that a given letter is selected based on probable words included in a lexicon of language model 111. Gesture module 108 may determine a first lexical cost value based on an entry in the lexicon indicating a frequency that the letter "R" is the first letter in a word.

As an example, gesture module 108 may receive an indication of tap gestures 124A and 124B. In response, gesture module 108 may determine a first token including the single string of predicted characters "re". Gesture module 108 may determine one or more candidate words indicated by the gesture using the first token. For instance, gesture module 108 may determine one or more candidate words for which the single string of predicted characters is a prefix, such as the words "rest", "rend", and the like.

In the present example, as user 150 continues to perform the tap gestures, gesture module 108 may receive an indication of tap gesture 124C. In response, gesture module 108 may create a token copy on each of the token's child nodes to include a predicted character indicated by the received portion of the gesture, such as the letter "v" corresponding to a predicted selection of the "V" key. As such, gesture module 108 may advance the first token to include the single string of predicted characters "rev". Based on the first token, gesture module 108 may determine one or more candidate words indicated by the gesture, such as words included in the lexicon for which the single string of predicted characters "rev" is a prefix (e.g., the words "review", "revolve", and the like).

In certain examples, gesture module 108 may maintain a threshold number of tokens (e.g., fifty tokens, one hundred tokens, two hundred tokens, or other numbers of tokens) and discard the rest. For instance, gesture module 108 may maintain a group of the one hundred tokens that include the most likely words indicated by the received gestures, as determined based on spatial model 110 and language model 111. In this way, gesture module 108 may efficiently scale to large lexicons.

Gesture module 108 may determine whether UI module 106 has completed receiving tap gestures 124. Where UI module 106 continues to receive tap gestures on character keys, gesture module 108 may continue to incrementally process the gesture data. In some examples, gesture module 108 may output one or more predictions prior to UI module 106 completing receipt of the tap gestures.

After receiving an indication of each tap gesture, gesture module 108 may determine one or more candidate words for display at the presence-sensitive display as auto-completion suggestions and/or a soft commit word. After UI module 106 has completed receiving the gesture path data corresponding to tap gestures 124, gesture module 108 may determine candidate words of "revolutionary" and "revolt" for display as auto-completion suggestions as seen in GUI 114 of FIG.

1. Gesture module 108 may further determine the candidate word "revolution" for display as a soft commit word, as seen in text entry area 126.

Gesture module 108 may retain one or more of the determined tokens. That is, gesture module 108 may maintain tokens after receiving an indication of a tap gesture, and may modify the tokens in response to receiving gesture data corresponding to a subsequent gesture being received at input device 202. As such, in response to receiving an indication of a next gesture to select a next character key of the plurality of keys, gesture module 108 may create a token copy on each of the previously determined token's child nodes to include a predicted character indicated by the received gesture.

If a next gesture is determined to be a selection of space key 123D, gesture module 108 may perform a hard commit. That is, gesture module 108 may send the displayed soft commit to other components associated with computing device 102 (e.g., applications 112). Gesture module 108 may perform a hard commit in response to receiving a selection of a displayed auto-complete suggestion (i.e., a candidate word displayed in one of word suggestion areas 122). In such case, gesture module 108 may send the displayed auto-complete suggestion to one or more components associated with computing device 102. In some examples, gesture module 108 may discard the determined candidate strings and/or candidate words after performing a hard commit. Upon receiving an indication of a subsequent gesture, gesture module 108 may create a new set of candidate strings. In other examples, gesture module 108 may not discard candidate strings or candidate words.

According to techniques of the present disclosure, gesture module 108 may dynamically modify values of a spatial model used in conjunction with a language model to determine one or more tokens based on received indications of one or more gestures to select one or more keys of a graphical keyboard. Gesture module 108 may thereby enable a user to accurately enter a word or phrase by providing a series of tapping or sliding gestures without requiring the user to accurately and precisely perform the gesture or gestures. In addition, by using the spatial model, as modified, along with the language model, gesture module 108 may dynamically vary the weighting of the models, thereby enabling more accurate text input. Moreover, by allowing the user to input gestures at higher speeds and less accuracy, techniques of the present disclosure may increase typing speed and efficiency by allowing a user to enter characters without requiring as much attention to precise inputs.

Figure 3A:
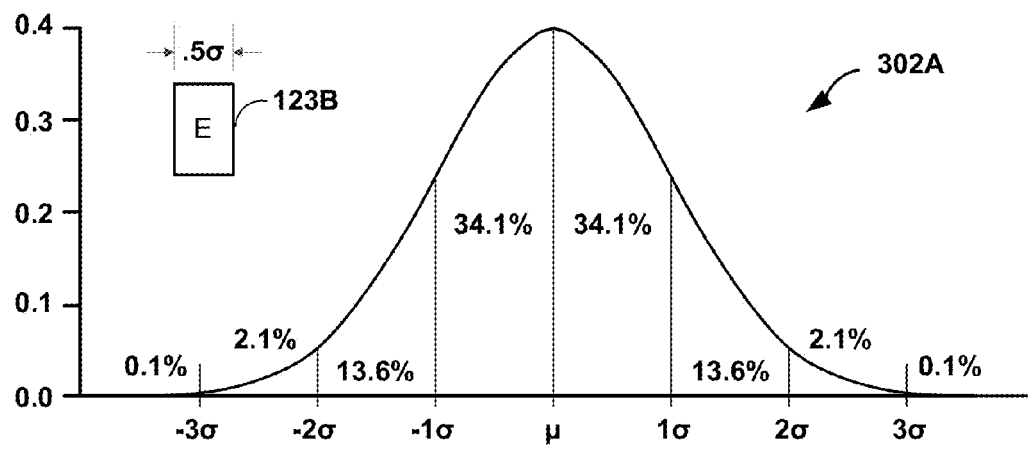
FIGS. 3A and 3B are block diagrams illustrating one example of modifying a spatial model to provide accurate text input, in accordance with one or more aspects of the present disclosure.
Figure 3B:
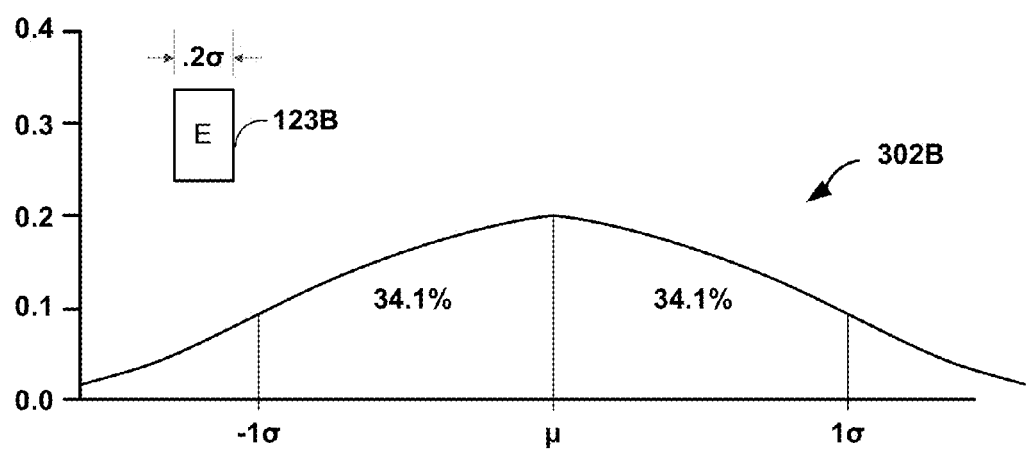

FIGS. 3A and 3B are block diagrams illustrating one example of modifying a spatial model to provide text input, in accordance with one or more aspects of the present disclosure. For purposes for illustration only, the example operations are described below within the context of computing device 102, as shown in FIGS. 1 and 2.

FIGS. 3A and 3B include an example graph of distribution models 302A and 302B (collectively "distribution models 302"), respectively, each displaying the expected distribution of touch points along a horizontal or x-axis for "E" key 123B. Distribution models 302 may be stored in spatial model 110. Though not shown in FIGS. 3A and 3B, spatial model 110 may also include a distribution model of expected touch point distribution along a vertical, or y-axis for "E" key 123B. Though the example of FIGS. 3A and 3B show a distribution model for "E" key 123B, distribution models for the other keys of, for example, graphical keyboard 128 may have similar characteristics.

Distribution models 302 may adhere to a Gaussian distribution pattern. Distribution models 302 may include a statistical average or mean, $\mu$, and a standard deviation value, $\sigma$. The mean value may represent the statistical, horizontal location of "E" key 123B. Initially, the mean value may be centered on "E" key 123B as displayed in graphical keyboard 128. The standard deviation value may be defined with respect to the physical size of "E" key 123B as displayed by graphical keyboard 128. The standard deviation value may represent the horizontal variability in expected touch point distribution. That is, a larger standard deviation value with respect to the physical size of "E" key 123B may indicate a wider variability in expected touch point distribution (i.e., more of the received touch points are expected to be received further from the mean). A smaller standard deviation value with respect to the physical size of "E" key 123B may indicate a narrower variability in expected touch point distribution (i.e., a larger number of the received touch points are expected to be received closer to the mean).

In either case, distribution models 302 may be defined by the probability distribution function of a Gaussian distribution, $$f(x; \mu, \sigma^2) = \frac{1}{\sqrt{2\pi\sigma^2}} e^{-\frac{1}{2}\left(\frac{x-\mu}{\sigma}\right)^2}. \tag{1}$$

In adherence with the Gaussian distribution, distribution models 302 may include approximately 68.2% of all expected touch points within one standard deviation of the mean. Distribution models 302 may include approximately 95.4% of all expected touch points within two standard deviations of the mean, and so on. Thus, by modifying the mean value and/or standard deviation value, gesture module 108 may more accurately determine a set of candidate strings in accordance with one or more techniques of the present disclosure. For instance, gesture module 108 may modify the horizontal mean value of "E" key 123B to account for a user regularly attempting to select "E" key 123B by tapping slightly to the right or left of the center of the key. In another example, gesture module 108 may modify the horizontal standard deviation value as described below. Further details of how gesture module 108 may utilize spatial model 110 are described with respect to FIG. 5 below.

FIG. 3A includes distribution model 302A. Distribution model 302A may represent a default or initial state of the horizontal model for "E" key 123B. For instance, spatial model 110 may contain distribution model 302A prior to receipt of any user input by computing device 102. As shown, distribution model 302A may include a mean value and standard deviation value. The standard deviation value may be twice the physical width of "E" key 123B, as displayed (i.e., the width of "E" key 123B is $0.5\sigma$). In other words, based on distribution model 302A, roughly 38.2% of touch inputs would be expected to fall within the left and right boundaries of "E" key 123B. In some examples, the standard deviation value may be based on the physical size of the keys of graphical keyboard 128. For example, when computing device 102 is a tablet, the keys may be relatively large and the width of a key may be roughly $4.13\sigma$. That is, approximately 96% of selections of "E" key 123B may fall within the left and right boundaries of the key. When the key is smaller, such as when computing device 102 is a smartphone, the width of "E" key 123B may be equal to $2\sigma$. In one example implementation, for a key width of 48 pixels, the horizontal standard deviation may be 1.2 times the width of the key. Various standard deviation values may be preset or experimentally determined in different situations.

The standard deviation value of 302A may represent the expected horizontal variability in received tap gestures when "E" key 123B is selected as a first character. However, in some situations, different standard deviation values may more accurately represent the expected variability. For instance, when a user selects a key that is located in the same row as "E" key 123B within graphical keyboard 128 (e.g., the "P" key or the "T" key), the variability in tap gestures to select "E" key 123B may increase in the horizontal direction. That is, after selecting a key in the same row, a user may be more likely to tap to the left or the right of the center of "E" key 123B compared to when tapping after selecting a key in a different row or when tapping "E" key 123B without tapping any other keys. In order to account for the increase in variability (i.e., tap gestures that are more sloppy in the horizontal direction), gesture module 108 may modify the horizontal standard deviation value of "E" key 123B.

FIG. 3B includes distribution model 302B. Distribution model 302B may represent a modified state of the horizontal model for "E" key 123B. As shown in FIG. 3B, the standard deviation value of distribution model 302B may be increased by two-and-a-half times. In some examples, increases and decreases in standard deviation values may be predetermined values for various criteria. For instance, while an increase of two-and-a-half times is shown in FIG. 3B, other increases or decreases may be larger or smaller in size in various situations. In other examples, standard deviation changes may be experimentally determined by computing device 102, or may be determined by a central server from a large number of devices and received by computing device 102 (e.g., via communication unit 204).

By increasing the standard deviation value for "E" key 123B, distribution model 302B may reduce the need for the user to accurately tap within the horizontal boundaries of "E" key 123B. That is, by using distribution model 302B, gesture module 108 may assign a lower cost value to an "e" character when receiving a tap input than would be assigned if gesture module 108 were using distribution model 302A. In this way, modification of spatial model 110 by gesture module 108 may increase the accuracy of text input.

Figure 4B:
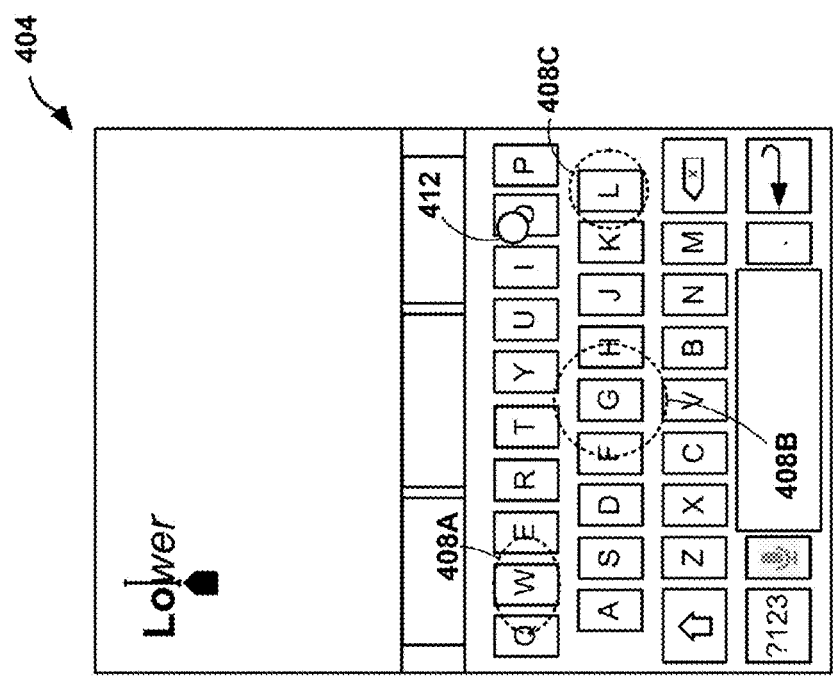
FIGS. 4A and 4B are block diagrams illustrating example GUIs for modifying a spatial model to provide accurate text input, in accordance with one or more aspects of the present disclosure.
Figure 4A:
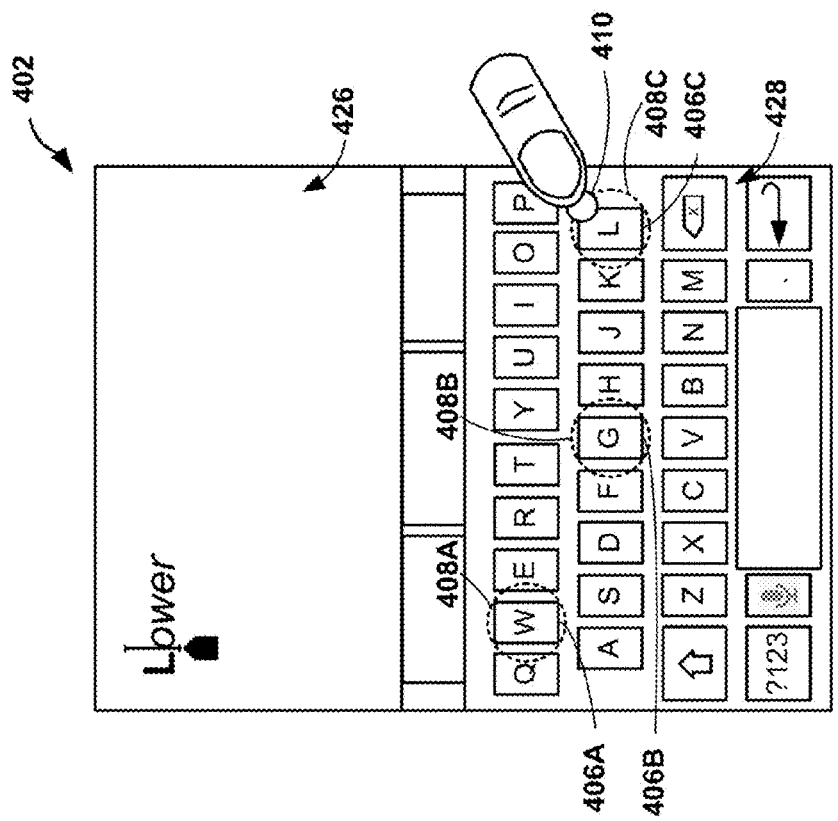

FIGS. 4A and 4B are block diagrams illustrating example GUIs of modifying a spatial model to provide accurate text input, in accordance with one or more aspects of the present disclosure. For purposes for illustration only, the example operations are described below within the context of computing device 102, as shown in FIGS. 1 and 2. GUIs 402 and 404 may be displayed by UI device 104 as described in FIG. 1.

In some example techniques, gesture module 108 may enable a user to enter text input and receive improved correction, completion, and/or prediction services without requiring improved accuracy by modifying a spatial model used in character determination. That is, computing device 102 may modify one or more attributes of spatial models for characters of a graphical keyboard in response to received text input, and may employ the modified spatial models to more accurately determine which characters were intended by a user as text input, which words are likely to be intended by the text input, and what text input may be next inputted. Such techniques are further illustrated in FIGS. 4A and 4B.

As shown in FIG. 4A, GUI 402 may include text entry area 426 and graphical keyboard 428. Initially, text entry area 426 may not include text. Each of the keys of graphical keyboard 428 may be associated with a statistical distribution model of a respective key. For instance, prior to receiving any text input, "W" key 406A, "G" key 406B, and "L" key 406C (collectively "keys 406") may be associated with statistical models 408A, 408B, and 408C, respectively. In the example of FIGS. 4A and 4B, statistical models 408A, 408B, and 408C (collectively "statistical models 408") may be default, or initial statistical models of the respective keys. That is, statistical models 408 may be predefined and stored in spatial model 110 before computing device 102 has received any text input.

Each of statistical models 408 may include one or more statistical locations of the associated key, a standard deviation value for both the horizontal (x) and vertical (y) axis, and a co-variance value for both the horizontal and vertical axis. In some examples, statistical models 408 may include other data about the associated key, such as the number of times the associated key has been pressed, a record of recent selections of the key, or other information. As displayed in FIGS. 4A and 4B, the location of statistical models 408 may represent the statistical location of the associated key, and the size and shape of statistical models 408 may represent the standard deviation values of the associated key. As seen in FIG. 4A, the statistical locations associated with keys 406 may be centered over their respective keys. Both the horizontal and vertical standard deviation values of statistical models 408 may be approximately equal to the height of the respective keys. In some examples, the horizontal and vertical standard deviations may not be the same.

A user of computing device 102 (e.g., user 150), may perform tap gesture 410 to input an "l" character. Tap gesture 410 may not be exactly at the center of "L" key 406C. Instead, tap gesture 410 may be on the upper right corner of the key. UI device 104 may receive tap gesture 410, and UI module 106 may send an indication of tap gesture 410 to gesture module 108. In accordance with one or more aspects of the present disclosure, gesture module 108 may modify spatial model 110 based on the received indication. The modification of spatial model 110 may, in some examples, include a modification of values associated with "L" key 406C (e.g., statistical model 408C). In some examples, gesture module 108 may modify other values stored in spatial model 110, such as statistical models 408A, 408B, as well as spatial models of other keys.

FIG. 4B includes GUI 404 which may represent the state of statistical models 408 after user 150 performs a second tap gesture 412. User 150 may perform tap gesture 412 to input an "o" character. Gesture module 108 may receive an indication of tap gesture 412, and modify spatial model 110 accordingly. The modifications to spatial model 110 performed by Gesture module 108 may result in statistical models 408 as shown in GUI 404. For example, gesture module 108 may receive an indication of tap gesture 412, and determine one or more characteristics based on the received indication. The characteristics may include a location of input device 202 at which tap gesture 412 was received. For example, the input location may include an x-coordinate of input device 202 and a y-coordinate of input device 202. Based on the input location, gesture module 108 may determine a row of keys of graphical keyboard 428 within which tap gesture 412 was received. In the example of FIG. 4B, this may be the row of keys including "W" key 406A.

In response to determining the row of keys, gesture module 108 may modify the statistical model of keys in the row of keys. For example, gesture module 108 may increase the horizontal standard deviation value of statistical model 408A, associated with "W" key 406A, thereby accounting for the possibility that a next tap gesture to select "W" key 406A, located mostly horizontally (i.e., as opposed to both horizontally and vertically) from the current tap gesture 412, may include increased horizontal error. In another example, gesture module 108 may decrease the vertical standard deviation value of statistical model 408A, thereby accounting for the possibility that the next tap gesture will include decreased vertical error. That is, when a user selects a key and then slides a finger substantially directly to the left or the right, the tap gesture may be more likely to "overshoot" or "undershoot" (e.g., to the left or right) the horizontal location of the next intended key, but may be more accurately placed vertically with respect to the next intended key. In some examples, gesture module 108 may both increase the horizontal standard deviation value for a key and decrease the vertical standard deviation value for the key.

As shown in FIG. 4B, statistical model 408A may continue to have a mean value centered over "W" key 406A. However, in response to receiving an indication of tap gesture 412, gesture module 108 may reduce the vertical standard deviation value of statistical model 408A. Additionally, gesture module 108 may increase a horizontal standard deviation value of statistical model 408A. The modifications of statistical model 408A may account for the higher likelihood that user 150 will make a straight, horizontal motion from the "O" key to "W" key 406A, and thus may increase likely error in the horizontal direction, while decreasing likely error in the vertical direction.

In another example, gesture module 108 may modify statistical model 406B based on the received indications of tap gestures 410 and 412. In accordance with one or more aspects of the present disclosure, gesture module 108 may determine one or more characteristics associated with the received tap gestures. As previously described, the characteristics may include a location of input device 202 at which the tap gestures were received. Based on the determined location characteristics, gesture module 108 may determine that an "l" character and an "o" character were inputted by the tap gestures 410 and 412, respectively. In response to a high probability that the characteristics of a tap gesture indicates a specific key, gesture module 108 may use language model 111 to determine the likelihood of one or more keys being the next key selected, and modify spatial model 110 accordingly. For example, gesture module 108 may determine that there is a high probability that the location of tap gesture 410 indicates "L" key "406C and that the location of tap gesture 412 indicates an "O" key. Based on these high probabilities, gesture module 108 may use language model 111, and determine that there is a high likelihood that a "g" character will follow the "l" and "o" characters inputted, because there are a number of words beginning with "log" in the lexicon and/or the words beginning with "log" have a high frequency value.

Based on this determination, gesture module 108 may increase the vertical and/or horizontal standard deviation values of statistical model 408B in order to increase the likelihood that a selection near "G" key 406B will result in a lowest cost value being associated with adding a "g" character to the set of candidate strings. In some examples, gesture module 108 may decrease the vertical and/or horizontal standard deviation values of statistical models for keys associated with unlikely next characters, such as a "y" character. That is, based on the location of the previously received tap gestures, gesture module 108 may use language model 111 to determine likely next keys and increase the standard deviation values. Gesture module 108 may also determine unlikely next keys and decrease the standard deviation values. In this way, gesture module 108 may, in some examples, the importance of spatial model 110 when receiving a next tap input.

The modifications of statistical models 408A and 408B may be temporary. That is, upon receiving a third tap gesture, gesture module 108 may modify spatial model 110 to change the standard deviation values of statistical models 408A and 408B back to a previous state. In this way, gesture module 108 may enable computing device 102 to more accurately determine text input by using previous text input to estimate future text input error.

Gesture module 108 may also perform non-temporary modifications. As one example, in response to receiving an indication of tap gesture 410, gesture module 108 may modify spatial model 110 to change the statistical location of statistical model 408C associated with "L" key 206C. For instance, in response to receiving an indication of tap gesture 410, gesture module 108 may determine one or more characteristics associated with tap gesture 410. The characteristics may include a location of input device 202 at which tap gesture 410 was received. The location may include a vertical and horizontal location, such as pair of coordinate values in an x, y plane. In response to determining the location, gesture module 108 may modify a statistical location value of spatial model 110 associated with one or more keys of graphical keyboard 428.

Modifying the statistical location may include changing the vertical and horizontal components of the statistical location by a value determined based on the location of tap gesture 410. For example, gesture module 108 may calculate the horizontal and vertical distances between the statistical location of "L" key 406C and tap gesture 410. Gesture module 108 may then apply a multiplier (e.g., 0.5, 0.1, 0.01, etc.) to the calculated distances, and add the result to the statistical location values. In the example of FIG. 4A, the difference between the statistical location of statistical model 408C and tap gesture 410 may be 0.6 in the y-direction, and 0.4 in the x-direction. Based on this difference, gesture module 108 may determine a new statistical location for statistical model 408C by adding, for example, 0.06 to the y-value of the statistical location, and adding 0.04 to the x-value of the statistical location. In some examples, gesture module 108 may determine a new statistical location for the statistical model by calculating an average of previous values. For instance, a statistical model may represent the average of the previous horizontal values and the previous vertical values for the key. In response to determining a location characteristic, gesture module 108 may take a weighted average of the statistical location and the characteristic location by, for example, multiplying the horizontal and vertical statistical locations by 9, adding the respective horizontal and vertical characteristic locations, and dividing the result by 10.

As shown in FIG. 4B, the resultant statistical model 408C may be located slightly above and slightly to the right of the center of "L" key 206C. This modification may persist through the receipt of subsequent tap gestures. That is, gesture module 108 may not return statistical model 408C back to a previous state. In some examples, modifying the statistical location of a statistical model may be performed on more than one key for each tap gesture received, such as where physical cost values do not clearly indicate which key was intended. In this way, gesture module 108 may enable computing device 102 to account for repetitive errors in user input, such as those caused by how user 150 is holding computing device 102, what fingers user 150 is using to input text, etc.

In some examples, gesture module 108 may modify spatial model 110 in response to a determined input speed of text input. That is, when a user enters a number of tap inputs at a high rate of speed, gesture module 108 may increase the vertical and/or horizontal standard deviation values of one or more keys of keyboard 428. For instance, gesture module 108 may receive a series of indications of tap gestures performed by user 150. In accordance with one or more aspects of the present invention, gesture module 108 may determine an input speed characteristic of the received tap gestures. In some examples, the determined input speed (e.g., in taps per second) may be based on a certain number of the most recently received tap gestures (e.g., the last 3 tap gestures, the last 5 tap gestures, etc.). In other examples, the input speed may be determined based on all tap gestures received since the most recent hard commit. In any case, gesture module 108 may compare the input speed to a threshold value. The threshold value may be a predetermined value stored at computing device 102, or may be based on previous input received from users. In some examples, if the input speed of the tap gestures is less than the threshold value, gesture module 108 may refrain from modifying any standard deviation values stored in spatial model 110 based on the determined speed characteristic. In other examples, responsive to determining that the input speed is less than the threshold value, gesture module 108 may reduce one or more standard deviation values stored in spatial model 110. That is, when gesture module 108 determines an input speed below the threshold, gesture module 108 may reduce a horizontal and/or vertical standard deviation value of one or more keys of graphical keyboard 428, thereby increasing the importance of spatial model 110 in determining composite cost values.

If, however, gesture module 108 determines that the determined input speed is greater than or equal to the threshold, gesture module 108 may increase standard deviation values of one or more keys of graphical keyboard 428. Increasing standard deviation values may reduce the importance of spatial model 108 in determining a composite cost value for various candidate strings. In other examples, gesture module 108 may modify one or more standard deviation values of spatial model 110 by a factor proportionate to the determined speed characteristic. For instance, given a preset average input speed (in characters per second), S, a determined input speed, S', and a default standard deviation, σ', gesture module 108 may calculate a modified standard deviation value, $$\sigma' = \frac{s'}{s}\sigma. \tag{2}$$

In some examples, such as the case where a user is inputting gestures using a single finger, a more accurate adjustment can be made to spatial model 110 by determining what key is being tapped, what the last key was, and applying Fitts's law:

$$T = a + b \log(D/4\sigma' + 1),$$

where T is the time interval from the last key to the current key and D is the physical distance from the last key to the current key (i.e., the key associated with the standard deviation values being increased or decreased). In each case, gesture module 108 may increase the accuracy of predicted text input by modifying values of spatial model 110 for one or more keys, based on determined characteristics of received input, in order to weight the importance of spatial model 110 more or less heavily than the importance of language model 111. This flexibility may allow computing device 2 to more accurately predict text input and increase the overall typing speed and accuracy of the user.

Figure 5A:
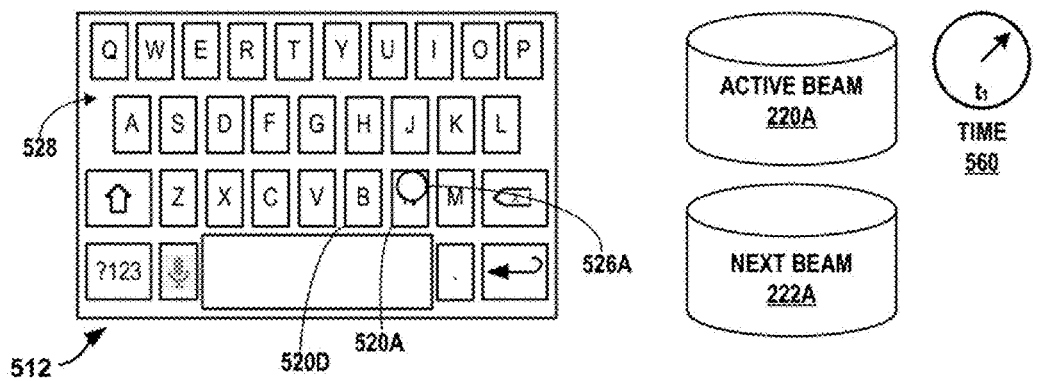
FIGS. 5A-C are block diagrams illustrating further details of one example of a computing device shown in FIG. 1, in accordance with one or more aspects of the present disclosure.
Figure 5B:
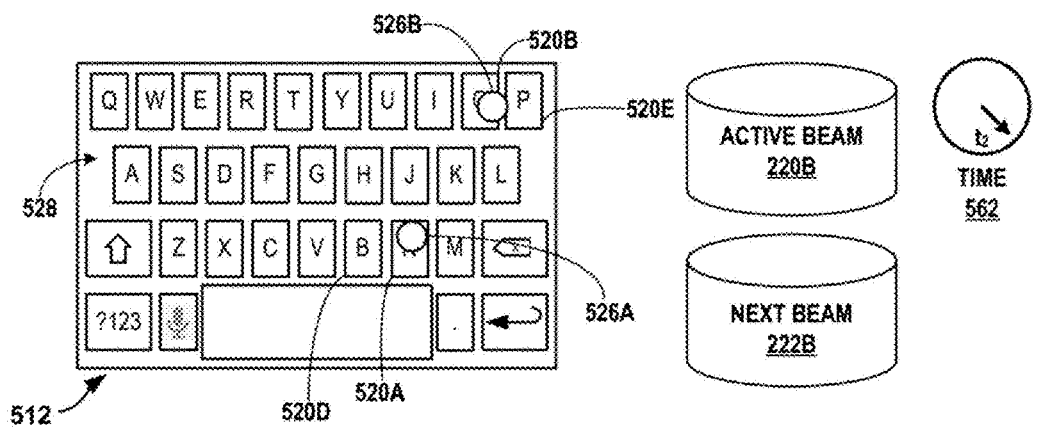
Figure 5C:
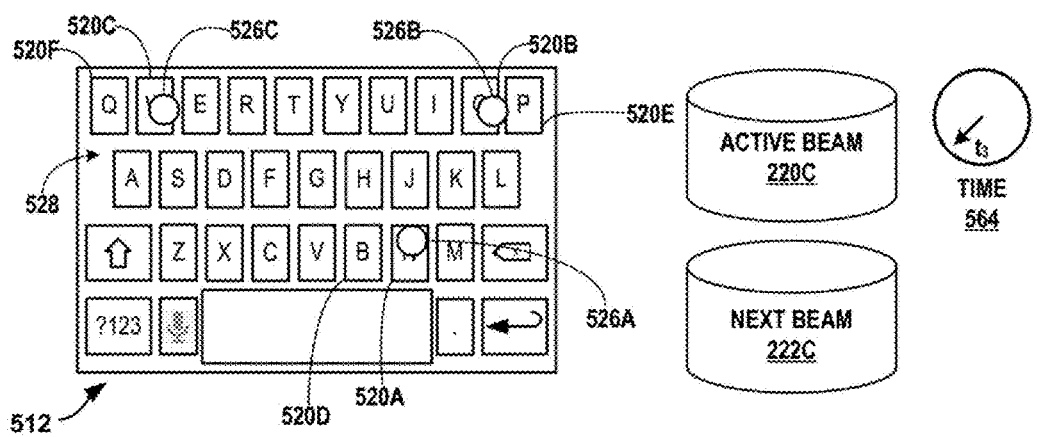

FIGS. 5A-C are block diagrams illustrating further details of one example of a computing device shown in FIG. 1, in accordance with one or more aspects of the present disclosure. The example illustrated in FIGS. 5A-C describes one implementation of the underlying unified model for providing text input. Text error correction may rely on two types of knowledge that is represented herein by spatial model 110, which models graphical keyboard 528 and relates received tap gestures or sliding gestures to the individual keys of graphical keyboard 528, and language model 111, which gives a probability distribution of what text input is likely to come next, given the received text input, as shown in FIGS. 1-2. Most generally, given a set of tap gestures, $s_1, s_2, \ldots, s_N$, performed at graphical keyboard 528, error correction is achieved by determining the string of characters (i.e., a candidate string), $c_1, c_2, \ldots, c_N$, such that $$\operatorname{argmax}_{c_1, \ldots, c_N} P(c_1, \ldots, c_N | s_1, \ldots, s_N). \tag{3}$$

That is, error correction as implemented in computing device 102 may find the candidate string which has a best probability value, given the sequence of tap gestures received. For instance, computing device 102 may apply Bayes' theorem to the conditional probability of equation (3) above to obtain $$\operatorname{argmax}_{c_1, \ldots, c_N} P(s_1, \ldots, s_N | c_1, \ldots, c_N) P(c_1, \ldots, c_N). \tag{4}$$

In other words, the "best" candidate string may be the candidate string which results in a maximum value when taking the product of two probability values. The first probability value may represent the probability of receiving the sequence of performed tap gestures, given the characters of the candidate string are the intended input. The second probability value may represent the probability that the characters of the candidate string are the intended input. In accordance with the techniques of the present disclosure, the first value may be determined by reference to spatial model 110 and the second value may be determined by reference to language model 111.

The number of tap inputs, N, at which to determine the respective probability values may be based on the indications of received tap gestures. In one example, gesture module 108 may access spatial model 110 and language model 111 only after receiving certain indicators, such as a selection of space key 123D. Rather than limiting the ability of the user to receive immediate text correction when, for example, the user is unsure about the number of characters in an intended word (e.g., attempting to enter "acess" for the word "access"), gesture module 108 may incrementally update the set of candidate strings after each received indication of a tap gesture. In this way, computing device 102 may provide the user with the immediate opportunity to review likely corrections and select a desired correction. In other words, because the user may desire to review suggestions after each tap gesture performed, gesture module 108 may use a value of N as small as one. In accordance with techniques of the present disclosure, gesture module 108 may predict a next word, and thus, N may be zero.

In some examples, gesture module 108 may retain a set of candidate strings, and update one or more strings as new indications are received, performing new determinations after each received indication. This process may continue until gesture module 108 performs a hard commit, as previously described. Examples which may cause gesture module 108 to perform a hard commit include a candidate string passing a threshold confidence value, the user's selection of a word delimiter, such as a space character or punctuation, or when the length of the candidate strings passes a threshold number of characters.

As described, language model 111 may include a lexicon and a word-level N-gram dictionary. Language model 111 may allow the user to enter non-words (i.e., words not in the lexicon) by allows providing the literal string of letters as a suggestion (e.g., in one of word suggestion areas 122). In some examples, once a non-word is entered a threshold number of times, the non-word may be added to the lexicon. The lexicon and word-level N-gram dictionary may provide more efficient storage requirements and better performance when compared to a character-level N-gram dictionary, for example.

Using the lexicon and word-level N-gram dictionary of language model 111, gesture module 108 may unify correction and word completion tasks by determining $$\text{argmax}_{w_N} P(w_1, \ldots, w_N | s_1, \ldots, s_M). \quad (5)$$

In equation (5), ($w_1, \ldots, w_{N-1}$) may represent a sequence of N−1 words already entered, $w_N$ may represent the current word being entered, and ($s_1, \ldots, s_M$) may be a sequence of M tap gestures performed in an attempt to enter $w_N$. In such instance, the value of M may be between one and the character length of $w_N$. Computing device 102 may apply Bayes' theorem to equation (5) resulting in $$\text{argmax}_{w_N} P(s_1, \ldots, s_M | w_1, \ldots, w_N) P(w_1, \ldots, w_N). \quad (6)$$

That is, computing device 102 may determine that the best candidate word is the word which results in a maximum product of the two probability values of equation (6). The first probability value may represent the likelihood of receiving the inputted tap gestures, given that the intended sequence of words is ($w_1, \ldots, w_N$). Gesture module 108 may determine the first probability value of equation (6) based on spatial model 110 as described. The second probability value may represent the likelihood (i.e., the frequency value) of the sequence of words, ($w_1, \ldots, w_N$). Gesture module 108 may determine the second probability value of equation (6) based on a word-level N-gram dictionary of language model 111 as described. In some examples, the tap gestures performed in order to input $w_N$ may be independent of the preceding words. That is, how gesture module 108 determines the current word may not be affected by what the preceding words are. In other words, $P(s_1, \ldots, s_M | w_1, \ldots, w_N)$ may be simplified to $P(s_1, \ldots, s_M | w_N)$. Consequently, for a current word, $w_N$, which consists of L characters, $c_1, \ldots, c_L$, the probability $P(s_1, \ldots, s_M | w_N)$ may be represented by computing device 102 as $P(s_1, \ldots, s_M | c_1, \ldots, c_L)$.

In the present example of FIGS. 5A-C, gesture module 108 may be modeled on the assumption that a user's tap gesture is independent of his or her future tap gestures. Thus, the probability, $P(s_1, \ldots, s_M | c_1, \ldots, c_L)$ can be simplified to $P(s_1, \ldots, s_M | c_1, \ldots, c_M)$. That is, gesture module 108 may use spatial model 110 to determine the probability of receiving the performed tap gestures, assuming the user intended to input the corresponding characters. This probability may depend on a user's input method. For example, a user typing on graphical keyboard 528 using both thumbs may perform tap gestures differently than a user typing with only one thumb, or with an index finger on the hand opposite the hand holding computing device 102. Additionally, tap gestures to select certain characters may, as described, be dependent on one or more previously performed tap gestures. Gesture module 108 may account for such dependencies by determining characteristics of one or more received tap gestures, and modifying spatial model 110 accordingly. In some examples, however, spatial model 110 may be predetermined based on the assumption that each inputted gesture is independent from the others. That is, $P(s_1, \ldots, s_M | c_1, \ldots, c_M)$ may be approximated by $P(s_1 | c_1) P(s_2 | c_2) \ldots P(s_M | c_M)$. In other words, for each candidate string, gesture module 108 may use spatial model 110 to determine a cost value by determining $$\Pi_{i=1}^{M} P(s_i | c_i). \quad (7)$$

In accordance with techniques of the present disclosure, spatial model 110 may store statistical models associated with keys of graphical keyboard 528. Each statistical model may adhere to a bivariate Gaussian distribution. In some examples, the vertical and horizontal Gaussian probabilities may be dependent. That is, the covariance may be non-zero. In other examples, the Gaussian probabilities may be independent, and thus the covariance may be zero. For ease of understanding only, the example described in FIGS. 3A, 3B, and 3C assume a covariance of 0. Therefore, the probability of receiving a given tap gesture, $s_i$, given the intended key, $c_i$, may be determined by gesture module 108 by using:

$$P(s_i | c_i) = \left( \frac{1}{\sqrt{2\pi\sigma_{xi}^2}} e^{-\frac{(x_i - \mu_{xi})^2}{2\sigma_{xi}^2}} \right) \left( \frac{1}{\sqrt{2\pi\sigma_{yi}^2}} e^{-\frac{(y_i - \mu_{yi})^2}{2\sigma_{yi}^2}} \right). \quad (8)$$

In equation (8), ($x_i$, $y_i$) may represent the location of the performed tap gesture, $s_i$, and ($\mu_{xi}$, $\mu_{yi}$) may represent the statistical location associated with the key for character $c_i$. As previously described, statistical models of spatial model 110 may include values for $\mu_{xi}$, $\mu_{yi}$, $\sigma_{xi}$, and $\sigma_{yi}$. Consequently, gesture module 108 may receive an indication of a tap gesture including a location of a performed tap gesture, ($x_i$, $y_i$). In response to receiving an indication, gesture module 108 may access spatial model 110 to retrieve the relevant values, $\mu_{xi}$, $\mu_{yi}$, $\sigma_{xi}$, and $\sigma_{yi}$, associated with one or more keys of graphical keyboard 528. For each key, gesture module 108 may apply equation (8) to determine a probability that the performed tap gesture was intended to select the key. This probability value may represent the physical cost value of adding a character associated with the key to a candidate string. Gesture module 108 may, based on equations (8) and (6), determine a composite cost value:

$$\text{argmax}_{w_N} P(w_1, \ldots, w_N) \quad (9)$$
$$\prod_{i=1}^{M} \left( \left( \frac{1}{\sqrt{2\pi\sigma_{xi}^2}} e^{-\frac{(x_i - \mu_{xi})^2}{2\sigma_{xi}^2}} \right) \left( \frac{1}{\sqrt{2\pi\sigma_{yi}^2}} e^{-\frac{(y_i - \mu_{yi})^2}{2\sigma_{yi}^2}} \right) \right).$$

Gesture module 108 may perform the analysis of equation (9) after each indication received, in order to determine physical cost values for the group of received tap inputs and lexical cost values (e.g., frequency values) for each candidate string.

In some examples, gesture module 108 may operate at a logarithmic scale. By applying a log function to equation (9), the computation may become a series of additions and subtractions, such that:

$$\operatorname{argmax}_{w_N} \log_{10} P(w_1, \ldots, w_N) + \log_{10} \prod_{i=1}^{M} \left( \frac{1}{\sqrt{2\pi\sigma_{xi}^2}} e^{\frac{-(x_i-\mu_{xi})^2}{2\sigma_{xi}^2}} \right) \left( \frac{1}{\sqrt{2\pi\sigma_{yi}^2}} e^{\frac{-(y_i-\mu_{yi})^2}{2\sigma_{yi}^2}} \right). \quad (10)$$

For ease of understanding, $S_{W_N}$ (the physical cost value of the word $w_N$) can be defined as the second half of equation (10), and $L_{W_N}$ (i.e., the lexical cost value of the word $W_N$) can be defined as the first half of equation (10) (i.e., the lexical cost value). Thus, a composite cost value or "total cost" value, $T_{W_N}$, may be determined by gesture module 108 as $$T_{W_N} = L_{W_N} + S_{W_N}. \quad (11)$$

Equation (11) may provide gesture module 108 with an accurate approximation for determining correction and completion of inputted text. Gesture module 108 may unify the correction and completion model with a prediction model by, in some examples, adding an additional cost (e.g., 0.6σ) to each candidate string's physical cost value for each additional key for which a tap gesture was not performed. In other examples, gesture module 108 may multiply a current spatial score by a factor of (L−M)/M where L is the number of characters in word $W_N$, and M is the number of tap gestures inputted. That is, each additional key for which a tap gesture was not performed may be given a physical cost value equal to the average physical cost value of those characters already contained in a candidate string. In other words, gesture module 108 may predict that the user will continue to input tap gestures at the same average level of precision. In other examples, gesture module 108 may assign other cost values to not-yet-selected characters of each word prediction, such as an additional lexical cost value, or total cost value. By adding a cost value for predicted characters, longer words may get proportionately ranked lower, before factoring in the lexical cost value.

Gesture module 108 may account for insertion and omission errors. Insertion errors may represent those errors where one or more additional characters are selected, but do not belong in a word (e.g., tap gestures inputting "abourt" for "about"). Omission errors may represent errors in which one or more characters are accidentally not selected (e.g., tap gestures inputting "abot" for "about"). Instead of using deterministic mapping from a word, w, to a character sequence, spelling(w), gesture module 108 may employ probabilistic mapping that includes insertions/deletions. In one example, once a number of received tap gestures (e.g., 2-4) have been entered for a current word, if the total cost value of the best candidate word, $T_{C1}$, minus the total cost value of the second best candidate word, $T_{C2}$, is lower than a specified threshold, gesture module 108 may run alternative insertion/omission alternative hypotheses. For instance, gesture module 108 may insert one or more wild card characters. Wild card characters may also account for an omitted or inserted space character. If a hypothesis has a much higher total score than $T_{C1}$ and $T_{C2}$, the hypothesis may be presented to the user (e.g., in one of word suggestion areas 122). Spelling errors may be accounted for in a similar manner. That is, in some examples, gesture module 108 may account for spelling errors, insertion errors, and omission errors by employing a probabilistic model instead of a deterministic model.

The process of FIGS. 5A-C may represent one example of operations performed by gesture module 108. In the example of FIGS. 5A-C computing device 102 receives a series of tap gestures. In other examples, techniques of the present disclosure may be applied to sliding or "swiping" gestures. For example, computing device 102 may determine a group of keys in response to receiving a gesture path. Gesture module 108 may determine a candidate word by determining a group of alignment points traversed by the gesture path. An alignment point is a point along the gesture path that may indicate a key of the plurality of keys. An alignment point may include one or more coordinates corresponding to the determined position of the alignment point. For instance, an alignment point may include Cartesian coordinates corresponding to a point on input device 202. That is, techniques of the present disclosure are described herein in relation to tap gestures, but may readily be applied to sliding gestures by using alignment points of the gesture path instead of locations of the tap gestures.

As shown in the example of FIG. 5A, at time 560, computing device 102 may include GUI 512, active beam 220A, and next beam 222A. GUI 512 may include graphical keyboard 528 which may include "N" key 520A, "B" key 520D, and a received tap gesture 526A. While shown in FIG. 5A, tap gesture 526A may not be visible during the performance of the techniques described herein.

A user (e.g., user 150) may desire to enter text into computing device 102 by performing a series of tap gestures at graphical keyboard 528. As previously discussed, as user 150 performs the tap gestures, computing device 102 may detect each gesture at UI device 104. In the example of FIG. 3A, computing device 102 is shown as having detected tap gesture 526A.

In response to detecting tap gesture 526A, computing device 102 may determine one or more characteristics associated with the received indication. Based on the characteristics, computing device 102 may, in some examples, modify values of spatial model 110. For ease of understanding, in the example of FIGS. 5A-C, computing device 102 may determine that no modification is required. In response to detecting tap gesture 526A, computing device 102 may create a token and push the token into active beam 220A. At time 560, the contents on active beam 220A may be represented by Table 1 below.

TABLE 1

| Index | Parent Index | Letter Key of Current Node | Letter Chain | Cost Value |
|---|---|---|---|---|
| 0 | — | — | — | 0 |

In Table 1, each row represents an individual token, the index column represents a unique identifier for each token, the parent index column represents the index value of the token to which the listed token is a child, the letter key of the current node column represent the letter key represented by the current node of the token, the letter chain column represents all of the letter keys represented by the nodes from the entry node to the current node of the token (i.e., the candidate string), and the cost value column may represent the total cost value, $T_{W_N}$, of the token. As shown in Table 1, the created token has an index of 0 (i.e., $token_0$), no parent index, no letter key of the current node, no letter chain, and a total cost value of zero.

To determine the text indicated by the gesture, computing device 102 may create a copy of each token on its child nodes. In some examples, an entry node may have 26 child nodes (one for each letter of the English alphabet). For simplicity, in the example of FIG. 5A, the entry node has only two child nodes on the letters "B" and "N". Therefore, computing device 102 may create a copy of the token with index 0 on child node "N" (i.e. $token_1$) and child node "B" (i.e. $token_2$). For each created token copy, computing device 102 may determine a total cost value by, for example, applying equation (10) as described above. In other examples, computing device 102 may use other methods of computing the total cost value. Computing device 102 may push each token copy in to next beam 222A, the contents of which may be represented by Table 2 below.

TABLE 2

| Index | Parent Index | Letter Key of Current Node | Letter Chain | Cost Value |
|---|---|---|---|---|
| 1 | 0 | N | N | CV1 |
| 2 | 0 | B | B | CV2 |

The entries shown in Table 2 are identical in format to the entry shown in Table 1. In Table 2, token' has total cost value CV1 and $token_2$ has total cost value CV2. Computing device 102 may use the letter chain of individual tokens (i.e., the candidate strings) now in next beam 222A to predict one or more candidate words. Computing device 102 may store the candidate words in a list of output predictions. As described, each candidate word may add the average total cost value per character of the underlying candidate string to the total cost value of the candidate word for each additional character. For example, Table 3 below may represent the list of output predictions determined from the tokens in active beam 220A.

TABLE 3

| Index | Parent Index | Letter Chain | Cost Value |
|---|---|---|---|
| p0 | 0 | NO | CV1 + CV1 |
| p1 | 0 | NET | CV1 + CV1 + CV1 |
| p2 | 1 | BE | CV2 + CV2 |
| p3 | 1 | BOY | CV2 + CV2 + CV2 |

In Table 3, each row represents an output prediction. The index column represents a unique identifier for each item and may be separate from the index values of tokens. The parent index column represents the index value of the token upon which the listed candidate word is based, the letter chain column represents the candidate word, and the cost value column may represent the total cost value of the candidate word. As shown in Table 3, the created candidate word "NO" has an index of p0 (i.e., $word_{p0}$), was predicted based on $token_0$, and has a total cost value of two times CV1.

Computing device 102 may output the list of output predictions. In some examples, computing device 102 may determine a subset of the list of output predictions including candidate words which have the lowest cost values (i.e., the predictions with the best probability). Additionally, in some examples, computing device 102 may, after each subsequent received gesture, discard the list of output predictions and create a new list of output predictions based on the updated tokens. In other examples, computing device 102 may add to the list of output predictions. For instance, computing device 102 may modify the cost value of previously determined candidate words (e.g., make $word_{p0}$ more or less probable) in response to detecting a subsequent tap gesture.

After creating the token copies and the list of output predictions, computing device 102 may determine that $token_0$ is not a terminal node and discard $token_0$. Computing device 102 may subsequently determine whether active beam 220A is empty (i.e., contains no tokens). In response to determining that active beam 220A is empty, computing device 102 may copy the contents of next beam 222A to active beam 220B of FIG. 5B and discard the contents of next beam 222A.

In the example of FIG. 5B, computing device 102 is shown as having detected tap gesture 526B at time 562. As described above, the contents of active beam 220B may be represented by Table 2. Computing device 102 may determine one or more characteristics associated with the received indications, and modify spatial model 110 based at least in part on the determined characteristics. For example, characteristics determined based on an indication of tap gesture 526B may cause computing device 102 to modify the horizontal and vertical standard deviation values associated with other keys in the same row as "O" key 520B. For instance, computing device 102 may increase the horizontal standard deviation value associated with "Q" key 520F to more accurately represent a user's likely horizontal error as described with respect to FIGS. 4A and 4B. In addition to modifying spatial model 110, computing device 102 may, for each token in active beam 220B, create a copy on each child node. In the example of FIG. 5B, token' and token each have child nodes with letter keys "O" and "P". For each created token copy, computing device 102 may determine a total cost value as described above. That is, the total cost value may be determined using spatial model 110 and language model 111. Computing device 102 may push each token copy in to next beam 222B, the contents of which may be represented by Table 4 below.

TABLE 4

| Index | Parent Index | Letter Key of Current Node | Letter Chain | Cost Value |
|---|---|---|---|---|
| 3 | 1 | O | NO | CV1 + CV3 |
| 4 | 1 | P | NP | CV1 + CV4 |
| 5 | 2 | O | BO | CV2 + CV5 |
| 6 | 2 | P | BP | CV2 + CV6 |

The entries shown in Table 4 are identical in format to the entries shown in Table 1 and Table 2. In Table 4, the total cost value for each token includes the total cost value for the previous letters and the total cost value for the current letter. Computing device 102 may determine which, if any, of the tokens are on terminal nodes. For instance, computing device 102 may determine that $token_3$ is on a terminal node because its letter chain "NO" is a word. In response to determining that a token is on a terminal node, computing device 102 may copy the token to the list of output predictions. In some examples, computing device 102 may copy only the letter chain of the token to the list of candidate words.

Computing device 102 may subsequently determine whether active beam 220B is empty. In response to determining that active beam 220B is empty, computing device 102 may copy the contents of next beam 222B to active beam 220C of FIG. 5C and discard the contents of next beam 222B.

In the example of FIG. 5C, computing device 102 is shown as having detected tap gesture 526C at time 564. As described above, the contents of active beam 220C may be represented by table 4. Computing device 102 may determine characteristics of the received gestures, and may, in some examples, modify spatial model 110 in accordance with one or more aspects of the present disclosure. For ease of understanding, computing device 102 may determine no modification is needed. Computing device 102 may, for each token in active beam 220C, create a copy on each child node. In the example of FIG. 5C, $token_3$ through token each have child nodes with letter keys "O" and "P". For each created token copy, computing device 102 may determine a total cost value using spatial model 110 (as modified) and language model 111, as described above. Computing device 102 may push each token copy in to next beam 222C, the contents of which may be represented by Table 5 below.

TABLE 5

| Index | Parent Index | Letter Key of Current Node | Letter Chain Cost Value |
|---|---|---|---|
| 7 | 3 | W | NOW CV1 + CV3 + CV7 |
| 8 | 3 | Q | NOQ CV1 + CV3 + CV8 |
| 9 | 4 | W | NPW CV1 + CV4 + CV9 |
| 10 | 4 | Q | NPQ CV1 + CV4 + CV10 |
| 11 | 5 | W | BOW CV2 + CV5 + CV11 |
| 12 | 5 | Q | BOQ CV2 + CV5 + CV12 |
| 13 | 6 | W | BPW CV2 + CV6 + CV13 |
| 14 | 6 | Q | BPQ CV2 + CV6 + CV14 |

The entries shown in Table 5 are identical in format to the entries shown in Tables 1, 2, and 4. In Table 5, the total cost value for each token includes the total cost value for the previous letters and the total cost value for the current letter. Computing device 102 may determine the list of output predictions based on the tokens shown in Table 5. After determining one or more candidate strings, computing device 102 may determine which, if any, of the tokens are on terminal nodes. For instance, computing device 102 may determine that $token_7$ and $token_{11}$ are on terminal nodes because their respective letter chains "NOW" and "BOW" are words. In response to determining that a token is on a terminal node, computing device 102 may copy $token_7$ and $token_{11}$ to the list of output predictions as candidate strings. The list of output predictions may be represented by Table 6 below.

TABLE 6

| Index | Parent Index | Letter Chain | Cost Value |
|---|---|---|---|
| p0 | 7 | NOWHERE | CV1 + CV3 + CV7 + 4*(CV1 + CV3 + CV7)/3 |
| p1 | 11 | BOWS | CV2 + CV5 + CV11 + (CV2 + CV5 + CV11)/3 |
| p2 | 11 | BOWED | CV2 + CV5 + CV11 + 2*(CV2 + CV5 + CV11)/3 |
| ... | ... | ... | ... |
| p16 | 7 | NOW | CV1 + CV3 + CV7 |
| p17 | 11 | BOW | CV2 + CV5 + CV11 |

Computing device 102 may subsequently determine whether active beam 220C is empty. In response to determining that active beam 220C is empty, computing device 102 may copy the contents of next beam 222C to the active beam, and the process may continue as described. Upon receiving, for example, an indication of a selection of the space key, computing device 102 may perform a hard commit. That is, computing device 102 may use the candidate word having the best cost value as input, and may or may not discard all tokens in active beam 220 and next beam 222. In this way, computing device 102 may use active beam 220 and next beam 222 to maintain tokens and associated total cost values, in order to correct, complete, and predict text input in accordance with one or more aspects of the present disclosure.

Figure 6:
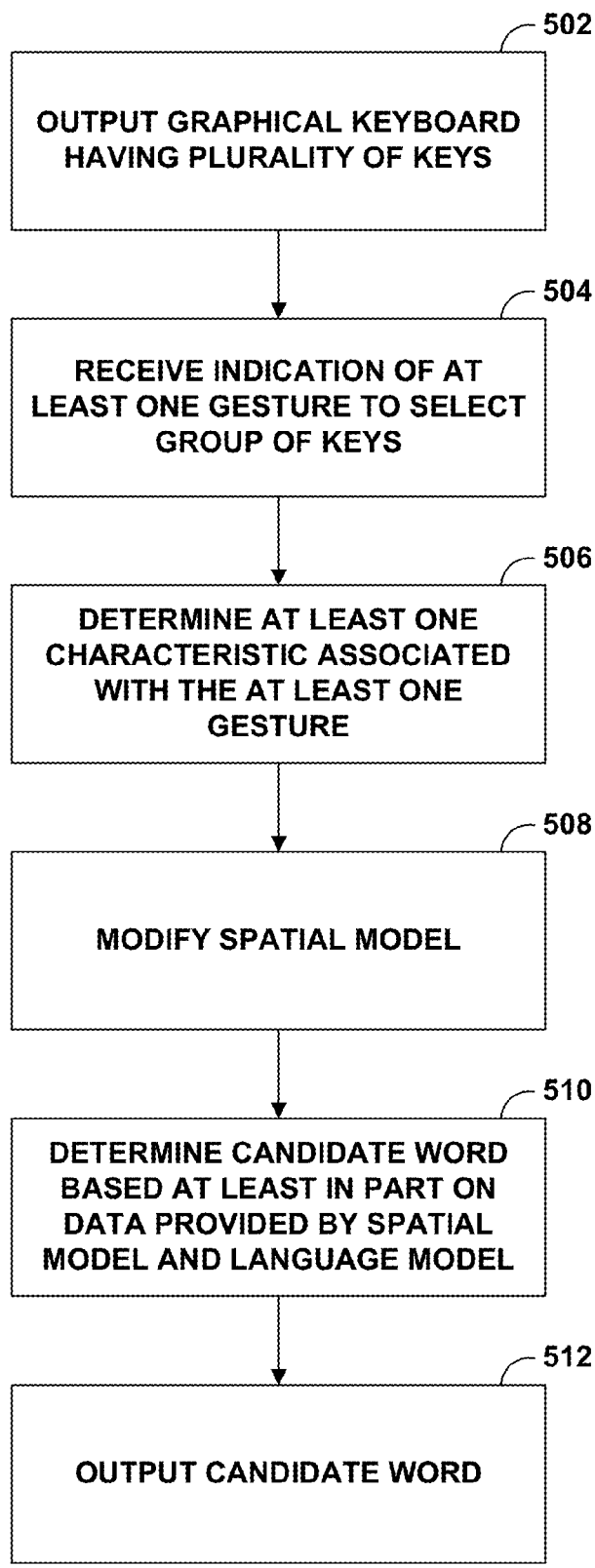
FIG. 6 is a flow diagram illustrating example operations that may be used to provide text input, in accordance with one or more aspects of the present disclosure.

FIG. 6 is a flow diagram illustrating example operations that may be used to provide text input, in accordance with one or more aspects of the present disclosure. For purposes of illustration only, the example operations are described below within the context of computing device 102, as shown in FIGS. 1 and 2.

In the example of FIG. 6, computing device 102 may initially output a graphical keyboard for display at a presence-sensitive display, the graphical keyboard having a plurality of keys (502). Computing device 102 may subsequently receive an indication of at least one gesture to select a group of keys of the plurality of keys (504). Computing device may determine at least one characteristic associated with the at least one gesture to select the group of keys of the plurality of keys (506). Based at least in part on the at least one characteristic, Computing device 102 may modify a spatial model (508). Computing device 102 may then determine a candidate word based at least in part on data provided by the spatial model and a language model (510). In some examples, the spatial model may provide a first portion of the data, based at least in part on the indication of the at least one gesture and the language model may provide a second portion of the data, based at least in part on a lexicon. Computing device 102 may output the candidate word for display at the presence-sensitive display (512).

In some examples, the at least one characteristic comprises an input speed associated with the at least one gesture, and modifying the spatial model comprises, in response to determining that the input speed satisfies a threshold value, modifying, by the computing device, a standard deviation value of the spatial model, wherein the standard deviation value is associated with a key of the plurality of keys. In some examples, the operations further include, in response to determining that the input speed is greater than the threshold value, increasing the standard deviation value. In some examples, the at least one characteristic comprises a location at the presence-sensitive display at which the at least one gesture is detected and modifying the spatial model comprises determining, by the computing device, a distance between the location of the at least one gesture and a statistical location of the spatial model, wherein the statistical location is associated with a key of the plurality of keys and in response to determining that the distance satisfies the threshold value, modifying the statistical location based at least in part on the determined location.

In some examples, the statistical location is a first statistical location, and modifying the first statistical location comprises, determining, by the computing device, a vertical modifier value by dividing a vertical component of the location of the at least one gesture by a positive integer value, determining, by the computing device, a horizontal modifier value by dividing a horizontal component of the location of the at least one gesture by the positive integer value, and determining, by the computing device, a second statistical location by adding the vertical modifier value to a vertical component of the first statistical location and adding the horizontal modifier value to a horizontal component of the first statistical location. In some examples, the at least one characteristic comprises a location at the presence-sensitive display at which the at least one gesture is detected, and modifying the spatial model comprises determining, by the computing device, a distance between the location of the at least one gesture and a second location of a key of the plurality of keys and in response to determining that the distance satisfies a threshold value, modifying, by the computing device and based at least in part on the determined distance, a standard deviation value of the spatial model, wherein the standard deviation value is associated with the key. In some examples, the indication is a first indication, and the operations further include receiving, by the computing device and subsequent to the modifying, a second indication of a second gesture to select a key of the plurality of keys, and modifying, by the computing device and in response to the receiving the second indication, the standard deviation value associated with the next key.

In some examples, the at least one characteristic comprises a location at the presence-sensitive display at which the at least one gesture is detected, the location corresponding to a row of keys of the graphical keyboard, and modifying the spatial model comprises determining, by the computing device, whether a key of the plurality of keys is located in the row of keys of the graphical keyboard and in response to determining that key is located in the row of keys, modifying, by the computing device, a standard deviation value of the spatial model wherein the standard deviation value is associated with the key. In some examples, modifying the standard deviation value further comprises increasing, by the computing device, a horizontal standard deviation value associated with the key. In some examples, the candidate word is a first candidate word, the method further comprising determining, by the computing device, a second candidate word based at least in part on one or more words displayed in a text area of the presence-sensitive display, and outputting, for display at the presence-sensitive display, the second candidate word subsequent to the one or more words displayed in the text area.

In some examples, determining the second candidate word comprises determining, by the computing device and based at least in part on the language model, at least one frequency value, wherein the at least one frequency value is associated with a sequence of words, and wherein the frequency value represents a frequency of occurrence of the sequence of words in an n-gram dictionary of the language model, and selecting, by the computing device, the second candidate word based at least in part on the at least one frequency value. In some examples, determining the candidate word further comprises determining, by the computing device and based at least in part on the spatial model, at least one candidate string and at least one cost value and determining, by the computing device and based at least in part on the language model, the candidate word, wherein the candidate word includes the at least one candidate string as a prefix, and wherein the candidate word is associated with a predicted cost value, the predicted cost value being based at least in part on the at least one cost value of the at least one candidate string. In some examples, In some examples, the at least one gesture comprises a plurality of tap gestures and determining a plurality of candidate strings and associated cost values comprises determining a plurality of tap locations each associated with a tap gesture of the plurality of tap gestures, determining respective cost values for each of at least two keys of the plurality of keys, wherein each of the respective cost values represents a probability that a tap location of the plurality of tap locations indicates a key of the plurality of keys, and comparing the respective cost values for each of at least two keys of the plurality of keys to determine a candidate string having a combined cost value. In some examples, determining a candidate word comprises determining, by the computing device and based at least in part on the language model, at least one frequency value, wherein the at least one frequency value is associated with a sequence of characters, and wherein the at least one frequency value represents a frequency of occurrence of the sequence of characters in the lexicon, and selecting, by the computing device and based at least in part on the determined at least one frequency value, the candidate word. In some examples, the language model further comprises a word-level n-gram dictionary.

In some examples, modifying the spatial model comprises modifying at least one of: a standard deviation value of the spatial model, a statistical location value of the spatial model, and a covariance value of the spatial model. In some examples, the at least one gesture comprises at least one sliding gesture. In some examples, outputting the candidate word comprises outputting, by the computing device and for display at the presence-sensitive display, characters of the candidate word associated with the group of keys in a first visual style, and outputting, by the computing device and for display at the presence-sensitive display; characters of the candidate word that are not associated with the group of keys in a second visual style.

In some examples, techniques of the present disclosure may include outputting, by a computing device and for display at a display device, a representation of a text area and receiving, by the computing device, a sequence of inputs from a user to select a plurality of characters. The techniques may also include, responsive to receiving the sequence of inputs, determining, by the computing device, a candidate word to output at a first position in the text area based at least in part on data provided by a spatial model and a language model, wherein the spatial model provides a first portion of the data used by the computing device to determine the candidate word based at least in part on spatial locations with respect to the computing device that are associated with the sequence of inputs, wherein the language model provides a second portion of the data used by the computing device to determine the candidate word based at least in part on one or more words displayed in the text area that precede the first position, and wherein the candidate word is not identical to the plurality of characters. The techniques may also include outputting, by the computing device and for display at the display device, a representation of the candidate word as a first word at the first position in the text area and, after outputting the representation of the first word, predicting, by the computing device, a second word that follows the first word at a second position in the text area based at least in part on additional data provided by the language model, wherein the additional data is based at least in part on one or more words displayed in the text area, including the first word, that precede the second position in the text area. The techniques may further include outputting, by the computing device and for display at the display device, a representation of the second word at the second position in the text area.

Figure 7:
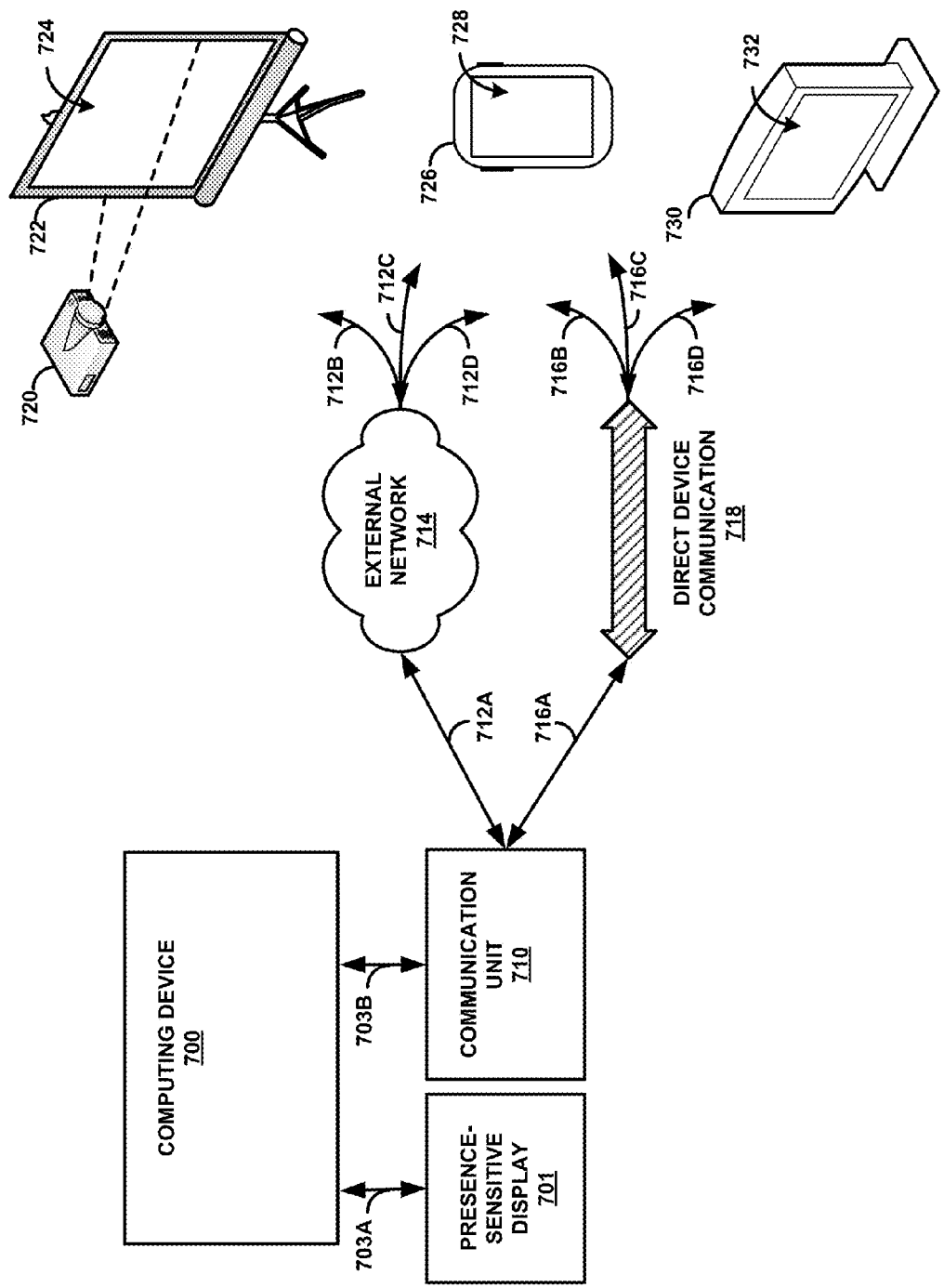
FIG. 7 is a block diagram illustrating an example computing device that outputs graphical content for display at a remote device, in accordance with one or more techniques of the present disclosure.

FIG. 7 is a block diagram illustrating an example computing device that outputs graphical content for display at a remote device, in accordance with one or more techniques of the present disclosure. Graphical content, generally, may include any visual information that may be output for display, such as text, images, a group of moving images, etc.

The example shown in FIG. 7 includes a computing device 700, presence-sensitive display 701, communication unit 710, projector 720, projector screen 722, tablet device 726, and visual display device 730. Although shown for purposes of example in FIGS. 1 and 2 as a stand-alone computing device 102, a computing-device may, generally, be any component or system that includes a processor or other suitable computing environment for executing software instructions and, for example, need not include a presence-sensitive display.

As shown in the example of FIG. 7, computing device 700 may be a processor that includes functionality as described with respect to processor 200 in FIG. 2. In such examples, computing device 700 may be operatively coupled to presence-sensitive display 701 by a communication channel 703A, which may be a system bus or other suitable connection. Computing device 700 may also be operatively coupled to communication unit 710, further described below, by a communication channel 703B, which may also be a system bus or other suitable connection. Although shown separately as an example in FIG. 7, computing device 700 may be operatively coupled to presence-sensitive display 701 and communication unit 710 by any number of one or more communication channels.

In other examples, such as illustrated previously in FIGS. 1-2, computing device 700 may be a portable or mobile device such as mobile phones (including smart phones), laptop computers, etc. In some examples, computing device 700 may be a desktop computers, tablet computers, smart television platforms, cameras, personal digital assistants (PDAs), servers, mainframes, etc.

As shown in FIG. 7, computing device 700 may also include and/or be operatively coupled with communication unit 710. Communication unit 710 may include functionality of communication unit 204 as described in FIG. 2. Examples of communication unit 710 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 700 may also include and/or be operatively coupled with one or more other devices, e.g., input devices, output devices, memory, storage devices, etc. that are not shown in FIG. 7 for purposes of brevity and illustration.

FIG. 7 also illustrates a projector 720 and projector screen 722. Other such examples of projection devices may include electronic whiteboards, holographic display devices, and any other suitable devices for displaying graphical content. Projector 720 and project screen 722 may include one or more communication units that enable the respective devices to communicate with computing device 700. In some examples, the one or more communication units may enable communication between projector 720 and projector screen 722. Projector 720 may receive data from computing device 700 that includes graphical content. Projector 720, in response to receiving the data, may project the graphical content onto projector screen 722. In some examples, projector 720 may determine one or more user inputs (e.g., continuous gestures, multi-touch gestures, single-touch gestures, etc.) at projector screen using optical recognition or other suitable techniques and send indications of such user input using one or more communication units to computing device 700.

Projector screen 722, in some examples, may include a presence-sensitive display 724. Presence-sensitive display 724 may include a subset of functionality or all of the functionality of UI device 104 as described in this disclosure. In some examples, presence-sensitive display 724 may include additional functionality. Projector screen 722 (e.g., an electronic whiteboard), may receive data from computing device 700 and display the graphical content. In some examples, presence-sensitive display 724 may determine one or more user inputs (e.g., continuous gestures, multi-touch gestures, single-touch gestures, etc.) at projector screen 722 using capacitive, inductive, and/or optical recognition techniques and send indications of such user input using one or more communication units to computing device 700.

FIG. 7 also illustrates tablet device 726 and visual display device 730. Tablet device 726 and visual display device 730 may each include computing and connectivity capabilities. Examples of tablet device 726 may include e-reader devices, convertible notebook devices, hybrid slate devices, etc. Examples of visual display device 730 may include televisions, computer monitors, etc. As shown in FIG. 5, tablet device 726 may include a presence-sensitive display 728. Visual display device 730 may include a presence-sensitive display 732. Presence-sensitive displays 728, 732 may include a subset of functionality or all of the functionality of UI device 104 as described in this disclosure. In some examples, presence-sensitive displays 728, 732 may include additional functionality. In any case, presence-sensitive display 732, for example, may receive data from computing device 700 and display the graphical content. In some examples, presence-sensitive display 732 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 700.

As described above, in some examples, computing device 700 may output graphical content for display at presence-sensitive display 701 that is coupled to computing device 700 by a system bus or other suitable communication channel. Computing device 700 may also output graphical content for display at one or more remote devices, such as projector 720, projector screen 722, tablet device 726, and visual display device 730. For instance, computing device 700 may execute one or more instructions to generate and/or modify graphical content in accordance with techniques of the present disclosure. Computing device 700 may output the data that includes the graphical content to a communication unit of computing device 700, such as communication unit 710. Communication unit 710 may send the data to one or more of the remote devices, such as projector 720, projector screen 722, tablet device 726, and/or visual display device 730. In this way, computing device 700 may output the graphical content for display at one or more of the remote devices. In some examples, one or more of the remote devices may output the graphical content at a presence-sensitive display that is included in and/or operatively coupled to the respective remote devices.

In some examples, computing device 700 may not output graphical content at presence-sensitive display 701 that is operatively coupled to computing device 700. In other examples, computing device 700 may output graphical content for display at both a presence-sensitive display 701 that is coupled to computing device 700 by communication channel 703A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 700 and output for display at presence-sensitive display 701 may be different than graphical content display output for display at one or more remote devices.

Computing device 700 may send and receive data using any suitable communication techniques. For example, computing device 700 may be operatively coupled to external network 714 using network link 712A. Each of the remote devices illustrated in FIG. 7 may be operatively coupled to network external network 714 by one of respective network links 712B, 712C, and 712D. External network 714 may include network hubs, network switches, network routers, etc., that are operatively inter-coupled thereby providing for the exchange of information between computing device 700 and the remote devices illustrated in FIG. 7. In some examples, network links 712A-712D may be Ethernet, ATM or other network connections. Such connections may be wireless and/or wired connections.

In some examples, computing device 700 may be operatively coupled to one or more of the remote devices included in FIG. 7 using direct device communication 718. Direct device communication 718 may include communications through which computing device 700 sends and receives data directly with a remote device, using wired or wireless communication. That is, in some examples of direct device communication 718, data sent by computing device 700 may not be forwarded by one or more additional devices before being received at the remote device, and vice-versa. Examples of direct device communication 718 may include Bluetooth, Near-Field Communication, Universal Serial Bus, WiFi, infrared, etc. One or more of the remote devices illustrated in FIG. 7 may be operatively coupled with computing device 700 by communication links 716A-716D. In some examples, communication links 712A-712D may be connections using Bluetooth, Near-Field Communication, Universal Serial Bus, infrared, etc. Such connections may be wireless and/or wired connections.

In accordance with techniques of the disclosure, computing device 700 may be operatively coupled to visual display device 730 using external network 714. Computing device 700 may output a graphical keyboard for display at presence-sensitive display 732. For instance, computing device 700 may send data that includes a representation of the graphical keyboard to communication unit 710. Communication unit 710 may send the data that includes the representation of the graphical keyboard to visual display device 730 using external network 714. Visual display device 730, in response to receiving the data using external network 714, may cause presence-sensitive display 732 to output the graphical keyboard. In response to a user performing one or more gestures at presence-sensitive display 732 to select a group of keys of the keyboard, visual display device 730 may send an indication of the gestures to computing device 700 using external network 714. Communication unit 710 may receive the indication of the gesture, and send the indication to computing device 700.

Computing device 700 may determine a number of characteristics (e.g., speed, location, etc.) associated with the gestures. In some examples, computing device 700 may modify, based at least in part on the determined characteristics, one or more values of a spatial model used in determining which keys were selected by the one or more gestures. For instance, if the input speed is higher than a threshold value, computing device 700 may increase standard deviation values associated with at least one key of the graphical keyboard. If the input speed is below a certain threshold value, computing device 700 may decrease the standard deviation values. In any case, computing device 700 may use the modified spatial model in accordance with the present disclosure to determine at least one candidate word based. Computing device 700 may send data that includes the candidate word to communication unit 710, which in turn sends the data to visual display device 730 using external network 714. Upon receiving the data, visual display device 730 may cause presence-sensitive display 732 to display the candidate word. In this way, computing device 700 may output the candidate word for display at presence-sensitive screen 732, in accordance with techniques of the disclosure.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
outputting, by a computing device and for display, a graphical keyboard comprising a plurality of keys;
receiving, by the computing device, a plurality of indications of input, each respective indication of input from the plurality of indications of input corresponding to a respective location of the graphical keyboard; and
for each respective indication of input from the plurality of indications of input, incrementally:
determining, by the computing device and based at least in part on both physical cost values from a spatial model and lexical cost values from a language model, at least one predicted current word based on a set of characters that correspond to the plurality of indications of input, wherein the spatial model comprises at least one respective distribution of touch points that corresponds to at least one respective key of the graphical keyboard, and wherein the at least one predicted current word is determined based on a physical cost value from the spatial model that is modified by a lexical cost value from the language model, the physical cost value representing a first likelihood that the plurality of indications of input correspond to the set of characters, and the lexical cost value representing a second likelihood that the set of characters are included in any word in a lexicon of the language model;
determining, by the computing device and based at least in part on the at least one predicted current word, at least one predicted next word that follows the at least one predicted current word; and
outputting, by the computing device and for display, the at least one predicted current word and the at least one predicted next word as a soft commit word in a text entry area of a graphical user interface by at least:
outputting, for display in a first visual style, characters of the at least one predicted current word and the at least one predicted next word that are from the set of characters that correspond to the plurality of indications of input; and
outputting, for display in a second visual style that is different than the first visual style, characters of the at least one predicted current word and the at least one predicted next word that are not from the set of characters that correspond to the plurality of indications of input.

2. The method of claim 1, further comprising:
for each respective indication of input from the plurality of indications of input, responsive to outputting at least the at least one predicted current word or the at least one predicted next word, incrementally modifying, by the computing device and based at least in part on a location of the key relative to a location of the respective indication of input, the spatial model.

3. The method of claim 1, wherein determining the at least one predicted current word comprises performing, based at least in part on both the spatial model and the language model, error correction and word completion for each respective indication of input to determine the at least one predicted current word.

4. The method of claim 1, wherein the set of characters is a portion of a complete word.

5. The method of claim 1, wherein the language model comprises a lexicon that includes context information.

6. The method of claim 1, wherein the language model comprises a word-level N-gram.

7. A computing device comprising:
at least one processor; and
memory configured to store instructions that, when executed, cause the at least one processor to:
output, for display, a graphical keyboard comprising a plurality of keys;
receive a plurality of indications of input, each respective indication of input from the plurality of indications of input corresponding to a respective location of the graphical keyboard; and
for each respective indication of input from the plurality of indications of input, incrementally:
determine, based at least in part on both physical cost values from a spatial model, and lexical cost values from a language model at least one predicted current word based on a set of characters that correspond to the plurality of indications of input, wherein the spatial model comprises at least one respective distribution of touch points that corresponds to at least one respective key of the graphical keyboard, and wherein the at least one predicted current word is determined based on a physical cost value from the spatial model that is modified by a lexical cost value from the language model, the physical cost value representing a first likelihood that the plurality of indications of input correspond to the set of characters, and the lexical cost value representing a second likelihood that the set of characters are included in any word in a lexicon of the language model;
determine, based at least in part on the at least one predicted current word that is the previous word, at least one predicted next word that follows the at least one predicted current word; and
output, for display, the at least one predicted current word and the at least one predicted next word as a soft commit word in a text entry area of a graphical user interface by at least:
outputting, for display in a first visual style, characters of the at least one predicted current word and the at least one predicted next word that are from the set of characters that correspond to the plurality of indications of input; and
outputting, for display in a second visual style that is different than the first visual style, characters of the at least one predicted current word and the at least one predicted next word that are not from the set of characters that correspond to the plurality of indications of input.

8. The computing device of claim 7, wherein the instructions, when executed, further cause the at least one processor to determine a plurality of sets of one or more predicted current words, each respective set of one or more predicted current words from the plurality of sets of one or more predicted current words being based on a respective set of characters that correspond to the plurality of indications of input.

9. The computing device of claim 7, wherein the instructions, when executed, further cause the at least one processor to perform error correction and word completion for each respective indication of input to determine the at least one predicted current word.

10. The computing device of claim 7, wherein the instructions, when executed, further cause the at least one processor to:
- determine, based at least in part on both a lexicon and a word-level N-gram, a frequency value associated with the set of characters, wherein the frequency value represents a frequency of occurrence of the set of characters in the lexicon; and
- determine, based at least in part on the frequency value, the at least one predicted current word.

11. The computing device of claim 7, wherein the lexicon comprises a listing of words and associated context information.

12. The computing device of claim 7, wherein the set of characters is a portion of a complete word.

13. A non-transitory, non-signal computer-readable medium encoded with instructions that, when executed, cause at least one processor to:
- output, for display, a graphical keyboard comprising a plurality of keys;
- receive a plurality of indications of input, each respective indication of input from the plurality of indications of input corresponding to a respective location of an input device; and
- for each respective indication of input from the plurality of indications of input, incrementally:
  - determine, based at least in part on both physical cost values from a spatial model, and lexical cost values from a language model, at least one predicted current word based on a set of characters that correspond to the plurality of indications of input, wherein the spatial model comprises at least one respective distribution of touch points that corresponds to at least one respective key of the graphical keyboard, and wherein the at least one predicted current word is determined based on a physical cost value from the spatial model that is modified by a lexical cost value from the language model, the physical cost value representing a first likelihood that the plurality of indications of input correspond to the set of characters, and the lexical cost value representing a second likelihood that the set of characters are included in any word in a lexicon of the language model;
  - determining, based at least in part on the at least one predicted current word, at least one predicted next word that follows the at least one predicted current word; and
  - output, for display, the at least one predicted current word and the at least one predicted next word as a soft commit word in a text entry area of a graphical user interface by at least:
    - outputting, for display in a first visual style, characters of the at least one predicted current word and the at least one predicted next word that are from the set of characters that correspond to the plurality of indications of input; and
    - outputting, for display in a second visual style that is different than the first visual style, characters of the at least one predicted current word and the at least one predicted next word that are not from the set of characters that correspond to the plurality of indications of input.

14. The non-transitory, non-signal computer-readable medium of claim 13, further encoded with instructions that, when executed, cause the at least one processor to:
- for each respective indication of input from the plurality of indications of input, responsive to outputting at least the at least one predicted current word or the at least one predicted next word, incrementally modify, by the computing device and based at least in part on a location of the key relative to a location of the respective indication of input, the spatial model.

15. The non-transitory, non-signal computer-readable medium of claim 13, wherein the instructions that cause the at least one processor to determine the at least one predicted current word comprise instructions that, when executed, cause the at least one processor to perform, based at least in part on both the spatial model and the language model, error correction and word completion for each respective indication of input to determine the at least one predicted current word.

16. The non-transitory, non-signal computer-readable medium of claim 13, wherein the at least one respective distribution of touch points comprises at least one respective two-dimensional Gaussian distribution.

17. The non-transitory, non-signal computer-readable medium of claim 13, wherein the set of characters is a portion of a complete word.

* * * * *